(12) United States Patent  
Boltanski et al.

(10) Patent No.: US 11,947,247 B2  
(45) Date of Patent: *Apr. 2, 2024

(54) FOLDED CAMERA WITH CONTINUOUSLY ADAPTIVE ZOOM FACTOR

(71) Applicant: Corephotonics Ltd., Tel Aviv (IL)

(72) Inventors: Rami Boltanski, Tel Aviv (IL); Ephraim Goldenberg, Tel Aviv (IL); Roy Rudnick, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,506

(22) Filed: May 18, 2023

(65) Prior Publication Data

US 2023/0288783 A1    Sep. 14, 2023

Related U.S. Application Data

(63) Continuation of application No. 17/788,489, filed as application No. PCT/IB2021/061078 on Nov. 29, 2021.

(Continued)

(51) Int. Cl.
*G03B 17/12* (2021.01)
*G02B 15/14* (2006.01)
*H04N 23/69* (2023.01)

(52) U.S. Cl.
CPC ..... *G03B 17/12* (2013.01); *G02B 15/143103* (2019.08); *H04N 23/69* (2023.01)

(58) Field of Classification Search
None
See application file for complete search history.

(56) References Cited

U.S. PATENT DOCUMENTS 2,106,752 A    2/1938 Land
2,354,503 A    7/1944 Arthur
(Continued)

FOREIGN PATENT DOCUMENTS

CN    101634738 A    1/2010
CN    102147519 A    8/2011
(Continued)

OTHER PUBLICATIONS

A compact and cost effective design for cell phone zoom lens, Chang et al., Sep. 2007, 8 pages.

(Continued)

*Primary Examiner* — Clayton E. LaBalle
*Assistant Examiner* — Diana Hancock
(74) *Attorney, Agent, or Firm* — Nathan & Associates; Menachem Nathan

(57) ABSTRACT

Folded Tele cameras comprising an optical path folding element (OPFE) for folding a first optical path OP1 to a second optical path OP2, a lens including N=8 lens elements, the lens being divided into three lens groups numbered, in order from an object side of the lens, G1, G2 and G3, and an image sensor, wherein G1 and G3 are included in a single G13 carrier, wherein G2 is included in a G2 carrier, wherein both the G13 carrier and the G2 carrier include rails for defining the position of G2 relative to G13, wherein the Tele camera is configured to change a zoom factor continuously between a minimum zoom factor $ZF_{MIN}$ and a maximum zoom factor $ZF_{MAX}$ by moving the G2 carrier relative to the G13 carrier and by moving the G13 carrier relative to the image sensor, and wherein an effective focal length (EFL) is 7.5 mm<EFL<50 mm. The G2 carrier may be positioned by a lens transporter within the G13 carrier at a particular zoom factor to form a lens pair to (Continued)

enable optical investigation and/or transporting of the lens pair.

21 Claims, 17 Drawing Sheets

Related U.S. Application Data

(60) Provisional application No. 63/119,853, filed on Dec. 1, 2020.

(56) References Cited

U.S. PATENT DOCUMENTS

| | | | |
|---|---|---|---|
| 2,378,170 A | 6/1945 | Aklin | |
| 2,441,093 A | 5/1948 | Aklin | |
| 3,388,956 A | 6/1968 | Eggert et al. | |
| 3,524,700 A | 8/1970 | Eggert et al. | |
| 3,558,218 A | 1/1971 | Grey | |
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 4,792,822 A | 12/1988 | Akiyama et al. | |
| 5,000,551 A | 3/1991 | Shibayama | |
| 5,327,291 A | 7/1994 | Baker et al. | |
| 5,331,465 A | 7/1994 | Miyano | |
| 5,969,869 A | 10/1999 | Hirai et al. | |
| 6,014,266 A | 1/2000 | Obama et al. | |
| 6,035,136 A | 3/2000 | Hayashi et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Souma | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay et al. | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,392,188 B2 * | 7/2016 | Shabtay | H04N 23/90 |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 10,070,060 B2 * | 9/2018 | Goldenberg | G03B 13/36 |
| 10,126,633 B2 * | 11/2018 | Avivi | G03B 17/17 |
| 2002/0118471 A1 | 8/2002 | Imoto | |
| 2003/0048542 A1 | 3/2003 | Enomoto | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2006/0238902 A1 | 10/2006 | Nakashima et al. | |
| 2006/0275025 A1 | 12/2006 | Labaziewicz et al. | |
| 2007/0229983 A1 | 10/2007 | Saori | |
| 2007/0247726 A1 | 10/2007 | Sudoh | |
| 2007/0253689 A1 | 11/2007 | Nagai et al. | |
| 2008/0056698 A1 | 3/2008 | Lee et al. | |
| 2008/0094730 A1 | 4/2008 | Toma et al. | |
| 2008/0094738 A1 | 4/2008 | Lee | |
| 2008/0291531 A1 | 11/2008 | Heimer | |
| 2008/0304161 A1 | 12/2008 | Souma | |
| 2009/0002839 A1 | 1/2009 | Sato | |
| 2009/0067063 A1 | 3/2009 | Asami et al. | |
| 2009/0122423 A1 | 5/2009 | Park et al. | |
| 2009/0141365 A1 | 6/2009 | Jannard et al. | |
| 2009/0147368 A1 | 6/2009 | Oh et al. | |
| 2009/0225438 A1 | 9/2009 | Kubota | |
| 2009/0279191 A1 | 11/2009 | Yu | |
| 2009/0303620 A1 | 12/2009 | Abe et al. | |
| 2010/0033844 A1 | 2/2010 | Katano | |
| 2010/0060995 A1 | 3/2010 | Yumiki et al. | |
| 2010/0165476 A1 | 7/2010 | Eguchi | |
| 2010/0214664 A1 | 8/2010 | Chia | |
| 2010/0277813 A1 | 11/2010 | Ito | |
| 2011/0001838 A1 | 1/2011 | Lee | |
| 2011/0032409 A1 | 2/2011 | Rossi et al. | |
| 2011/0080655 A1 | 4/2011 | Mori | |
| 2011/0102911 A1 | 5/2011 | Iwasaki | |
| 2011/0115965 A1 | 5/2011 | Engelhardt et al. | |
| 2011/0149119 A1 | 6/2011 | Matsui | |
| 2011/0157430 A1 | 6/2011 | Hosoya et al. | |
| 2011/0188121 A1 | 8/2011 | Goring et al. | |
| 2011/0249347 A1 | 10/2011 | Kubota | |
| 2012/0062783 A1 | 3/2012 | Tang et al. | |
| 2012/0069455 A1 | 3/2012 | Lin et al. | |
| 2012/0092777 A1 | 4/2012 | Tochigi et al. | |
| 2012/0105708 A1 | 5/2012 | Hagiwara | |
| 2012/0147489 A1 | 6/2012 | Matsuoka | |
| 2012/0154929 A1 | 6/2012 | Tsai et al. | |
| 2012/0194923 A1 | 8/2012 | Um | |
| 2012/0229920 A1 | 9/2012 | Otsu et al. | |
| 2012/0262806 A1 | 10/2012 | Lin et al. | |
| 2013/0057971 A1 | 3/2013 | Zhao et al. | |
| 2013/0088788 A1 | 4/2013 | You | |
| 2013/0208178 A1 | 8/2013 | Park | |
| 2013/0271852 A1 | 10/2013 | Schuster | |
| 2013/0279032 A1 | 10/2013 | Suigetsu et al. | |
| 2013/0286488 A1 | 10/2013 | Chae | |
| 2014/0022436 A1 | 1/2014 | Kim et al. | |
| 2014/0063616 A1 | 3/2014 | Okano et al. | |
| 2014/0092487 A1 | 4/2014 | Chen et al. | |
| 2014/0139719 A1 | 5/2014 | Fukaya et al. | |
| 2014/0146216 A1 | 5/2014 | Okumura | |
| 2014/0160581 A1 | 6/2014 | Cho et al. | |
| 2014/0204480 A1 | 7/2014 | Jo et al. | |

(56) References Cited

U.S. PATENT DOCUMENTS

| | | |
|---|---|---|
| 2014/0218799 A1* | 8/2014 | Suzuka ............. G02B 13/0065 |
| | | 359/557 |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0168667 A1 | 6/2015 | Kudoh |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0033742 A1 | 2/2016 | Huang |
| 2016/0044247 A1* | 2/2016 | Shabtay ................ H04N 23/45 |
| | | 348/240.3 |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1* | 3/2016 | Koguchi ............. G02B 15/144 |
| | | 359/696 |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0242225 A1* | 8/2017 | Fiske .................... H04N 23/57 |
| 2017/0276911 A1 | 9/2017 | Huang |
| 2017/0310952 A1 | 10/2017 | Adomat et al. |
| 2017/0329108 A1 | 11/2017 | Hashimoto |
| 2017/0337703 A1 | 11/2017 | Wu et al. |
| 2018/0024319 A1 | 1/2018 | Lai et al. |
| 2018/0024329 A1* | 1/2018 | Goldenberg ....... G02B 13/0065 |
| | | 359/557 |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0075284 A1 | 3/2019 | Ono |
| 2019/0086638 A1 | 3/2019 | Lee |
| 2019/0107651 A1 | 4/2019 | Sade |
| 2019/0121216 A1 | 4/2019 | Shabtay et al. |
| 2019/0170965 A1 | 6/2019 | Shabtay |
| 2019/0215440 A1 | 7/2019 | Rivard et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0333691 A1 | 10/2020 | Shabtay et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2012203234 A | 10/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.

(56) References Cited

OTHER PUBLICATIONS

Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

\* cited by examiner

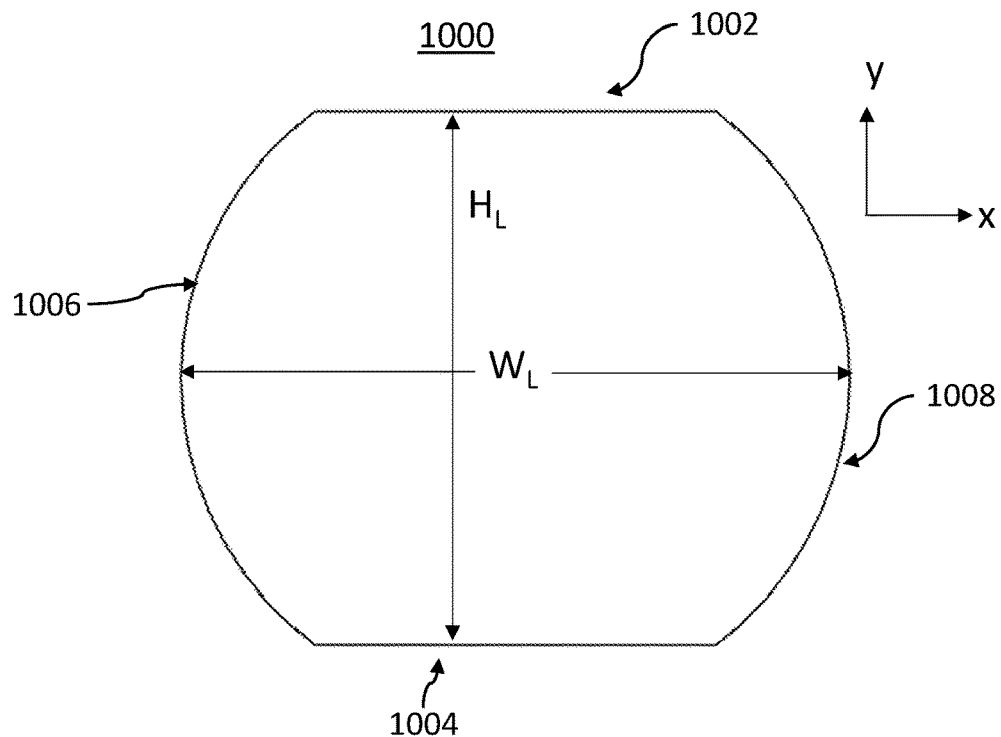
FIG. 10   KNOWN ART
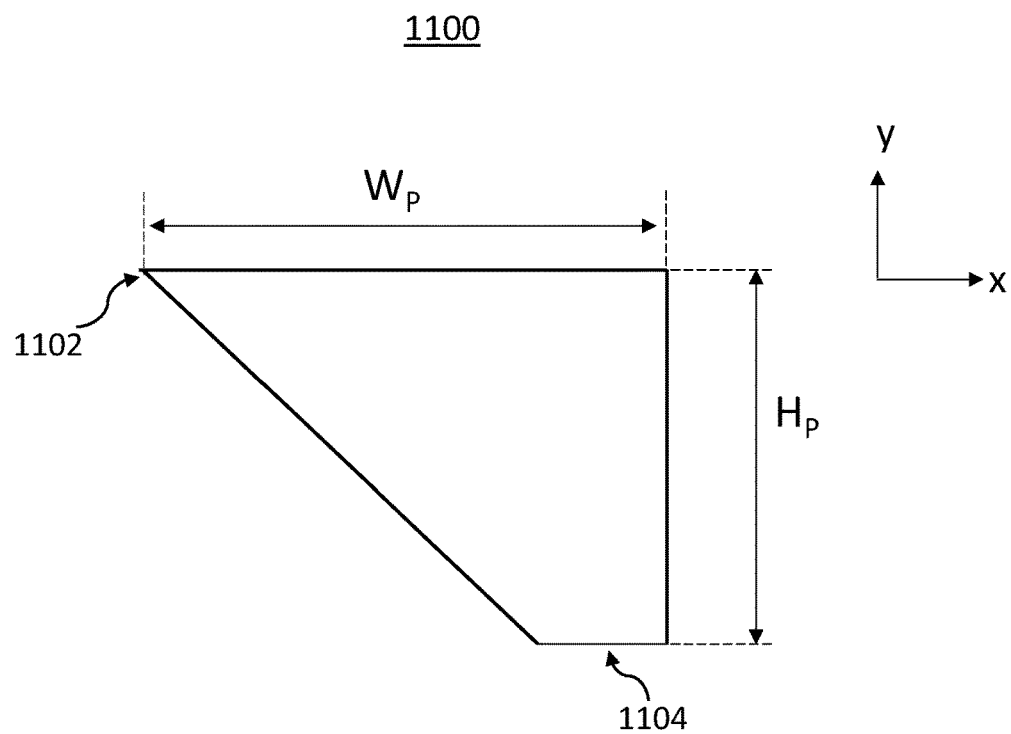
FIG. 11   KNOWN ART

FOLDED CAMERA WITH CONTINUOUSLY ADAPTIVE ZOOM FACTOR

CROSS REFERENCE TO RELATED APPLICATIONS

This is a continuation from U.S. patent application Ser. No. 17/788,489 filed Jun. 23, 2022 (now allowed), which was a 371 application from international patent application PCT/IB2021/061078 filed Nov. 29, 2021, and is related to and claims priority from U.S. Provisional Patent Application No. 63/119,853 filed on 1 Dec. 2020, which is expressly incorporated herein by reference in its entirety.

FIELD

Embodiments disclosed herein relate in general to digital cameras, and more particularly, to multi-aperture zoom digital cameras with a folded continuous zoom lens for use in handheld electronic mobile devices such as smartphones.

Definitions

The following symbols and abbreviations are used, all of terms known in the art:

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (or an assembly of lens elements L1 to LN), the distance between a rear principal point P' and a rear focal point F' of the lens.

f-number (f/#): the ratio of the EFL to an entrance pupil diameter.

BACKGROUND

Multi-aperture cameras (or "multi-cameras", of which a "dual-camera" having two cameras is an example) are now standard for handheld electronic mobile devices (or simply "mobile devices", for example smartphones, tablets, etc.). A multi-camera usually comprises a wide field-of-view FOV camera ("Wide" or "W" camera with $FOV_W$), and at least one additional camera with a narrower (than $FOV_W$) field-of-view (Telephoto or "T" camera, also referred to as "TC", with $FOV_T$). In general, the spatial resolution of the TC is constant (or "fixed") and may be for example 3, 5, or 10 times higher than the spatial resolution of the W camera. This is referred to as the TC having a fixed "zoom factor" (ZF) of, respectively, 3, 5, or 10.

As an example, consider a dual-camera having a W camera and a TC with ZF of 5. When zooming onto a scene, one may in general use W camera image data, which is digitally zoomed up to a ZF of 5. For a ZF>5, one may use TC image data, digitally zoomed for ZF>5. In some scenes, a high ZF is desired for capturing scene segments with high resolution. In other scenes, a high ZF is undesired, as only (digitally zoomed) W camera image data may be available. This shows the trade-off between the applicability range of the TC on the one hand (which is larger for TCs with smaller ZF) and the TC's zoom capability on the other hand (which is larger for TCs with larger ZF). In general, both large applicability range and large zoom capability are beneficial. This cannot be achieved in known TCs having a fixed ZF.

For a given image sensor included in a TC, the TC's ZF is determined solely by its effective focal length (EFL). A TC that can switch between two discrete EFLs, $EFL_1$ and $EFL_2$, for providing two discrete ZFs, $ZF_1$ and $ZF_2$, is described for example in co-owned PCT patent PCT/IB20202/051405.

To achieve both large applicability range and large zoom capability in a single Tele camera, there is need and it would be beneficial to have a Tele camera that can provide all ZFs between a minimum zoom factor $ZF_{MIN}$ and a maximum zoom factor $ZF_{MAX}$ continuously.

SUMMARY

In various embodiments, there are provided cameras comprising an optical path folding element (OPFE) for folding a first optical path OP1 to a second optical path OP2, a lens including N lens elements, the lens being divided into three lens groups numbered, in order from an object side of the lens, G1, G2 and G3, and an image sensor, wherein the camera is a folded Tele camera, wherein G1 and G3 are included in a single G13 carrier, wherein G2 is included in a G2 carrier, wherein the Tele camera is configured to change a zoom factor continuously between $ZF_{MIN}$ and $ZF_{MAX}$ by moving the G2 carrier relative to the G13 carrier and by moving the G13 carrier relative to the image sensor, and wherein an effective focal length is 7.5 mm<EFL<50 mm.

In some embodiments, both the G13 carrier and the G2 carrier include rails for defining the position of G2 relative to G13.

In some embodiments, for switching from $ZF_{MIN}$ and $ZF_{MAX}$, the movement of the G13 carrier with respect to the image sensor is over a stroke larger than 2 mm and smaller than 15 mm, and the movement of the G2 carrier with respect to the image sensor is over a stroke larger than 0.1 mm and smaller than 5 mm.

In some embodiments, the folded Tele camera is configured to be focused by moving lens groups G1+G2+G3 together as one lens.

In some embodiments, N=8.

In some embodiments, the folded Tele camera is included in a camera module having a module height $H_M$, wherein the lens has a lens aperture height $H_A$, wherein both $H_M$ and $H_A$ are measured along an axis parallel to OP1 and wherein $H_M<H_A+3$ mm. In some embodiments, $H_M<H_A+2$ mm.

In some embodiments, the lens is a cut lens with a cut lens aperture height $H_{A-CUT}$ measured along an axis parallel to OP1 and a lens aperture width $W_A$ measured along an axis perpendicular to both OP1 and OP2, wherein $W_A$ is larger than $H_{A-CUT}$ by between 5% and 50%. In some embodiments, $W_A \geq 1.1\ H_{A-CUT}$. In some embodiments, $W_A > 1.2\ H_{A-CUT}$.

In some embodiments, lens groups G1 and G2 include 3 lens elements and lens group G3 includes 2 lens elements.

In some embodiments, lens groups G1 and G2 have positive lens power and lens group G3 has negative lens power.

In some embodiments, the EFL is switched continuously between a minimal effective focal length $EFL_{MIN}$ corresponding to $ZF_{MIN}$ and a maximal effective focal length $EFL_{MAX}$ corresponding to $ZF_{MAX}$, wherein a ratio $EFL_{MAX}/EFL_{MIN}>1.5$. In some embodiments, $EFL_{MAX}/$ $EFL_{MIN}>1.75$. In some embodiments, $EFL_{MIN}$ is in the range of 10 mm-25 mm and $EFL_{MAX}$ is in the range of 20 mm-50 mm.

In some embodiments, the folded Tele camera has an aperture diameter DA that not depend on the EFL. In some embodiments, the folded Tele camera has a f number f/#, wherein a minimal f number $f/\#_{MIN}=EFL_{MIN}/DA$ and wherein $f/\#=f/\#_{MIN}+(EFL-EFL_{MIN})/DA$. In some embodiments, $f/\#_{MIN}=EFL_{MIN}/DA$ and $f/\#_{MIN}$ is <3.

In some embodiments, $f/\#_{MIN}$ is <2.5.

In some embodiments, the OPFE is a prism. In some embodiments, the OPFE is configured to be rotated for optical image stabilization (OIS) along two rotation axes, a first rotation axis parallel to OP1 and a second rotation axis perpendicular to both OP1 and OP2. In some embodiments, the prism is a cut prism with a prism optical height $H_{P-CUT}$ measured along an axis parallel to OP1 and a prism optical width $W_P$ measured along an axis perpendicular to both OP1 and OP2, and wherein $W_P$ is larger than $H_{P-CUT}$ by between 5% and 30%.

In some embodiments, the G2 and G13 carriers are movable by, respectively, G2 and G13 actuators in the form of voice coil motors (VCMs).

In some embodiments, the VCM of the G13 actuator includes three or more magnets. In some embodiments, a maximum lens stroke S is required for switching from $EFL_{MIN}$ to $EFL_{MAX}$ or vice versa, wherein a ratio R of the EFL difference and S is $R=(EFL_{MAX}-EFL_{MIN})/S$, and wherein R>1.75. In some embodiments, R>2.

In some embodiments, a folded Tele camera as above or below is included in a smartphone.

In an embodiment, there is provided a lens transporter for positioning the G2 carrier within the G13 carrier at a particular zoom factor to form a lens pair, wherein the lens transporter enables optical investigation and/or transporting of the lens pair.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify embodiments disclosed herein and should not be considered limiting in any way. In the drawings:

FIG. 10 shows an example a cut lens as known in the art;

FIG. 11 shows an example a cut prism as known in the art.

DETAILED DESCRIPTION

Figure 1:
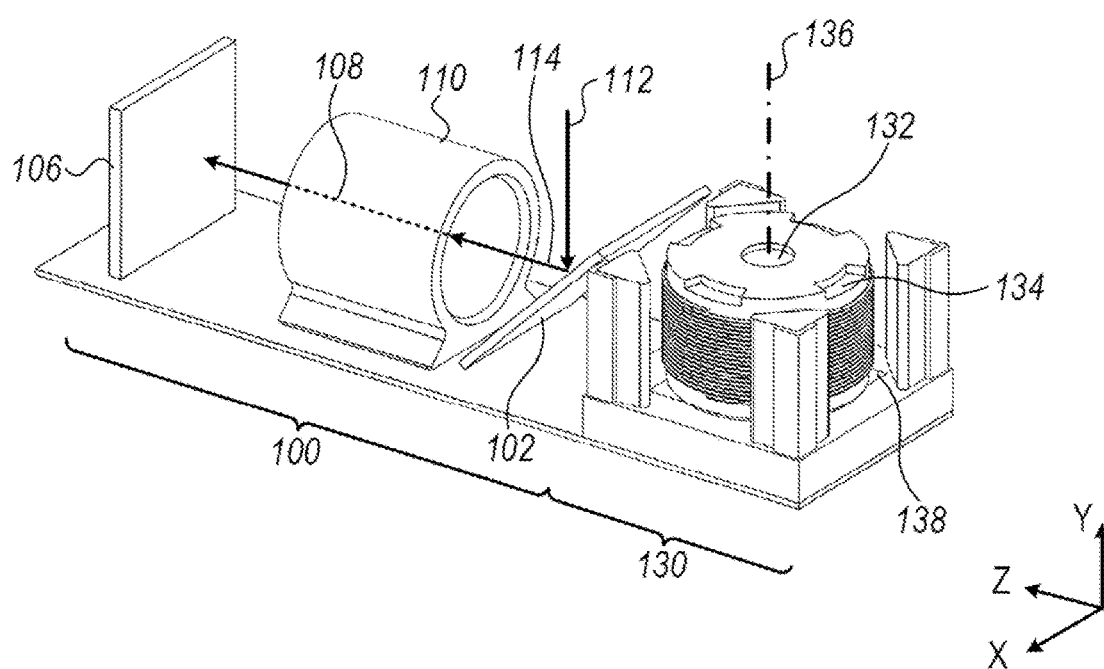
FIG. 1 shows schematically a general perspective view of a dual-camera, comprising an upright camera and a zoom folded camera.

FIG. 1 illustrates a dual-camera 150 that comprises a folded continuous zoom T camera (or "FCZT camera") 100 as disclosed herein together with a W camera 130. T camera 100 comprises an OPFE 102 e.g. a prism or mirror, a lens 110 with a plurality of lens elements (not visible in this representation) and an image sensor 106. OPFE folds an optical path from a first optical path 112 to a second optical path 114. W camera 130 comprises a lens 134 with an optical axis 136 and an image sensor 138.

Figure 2A:
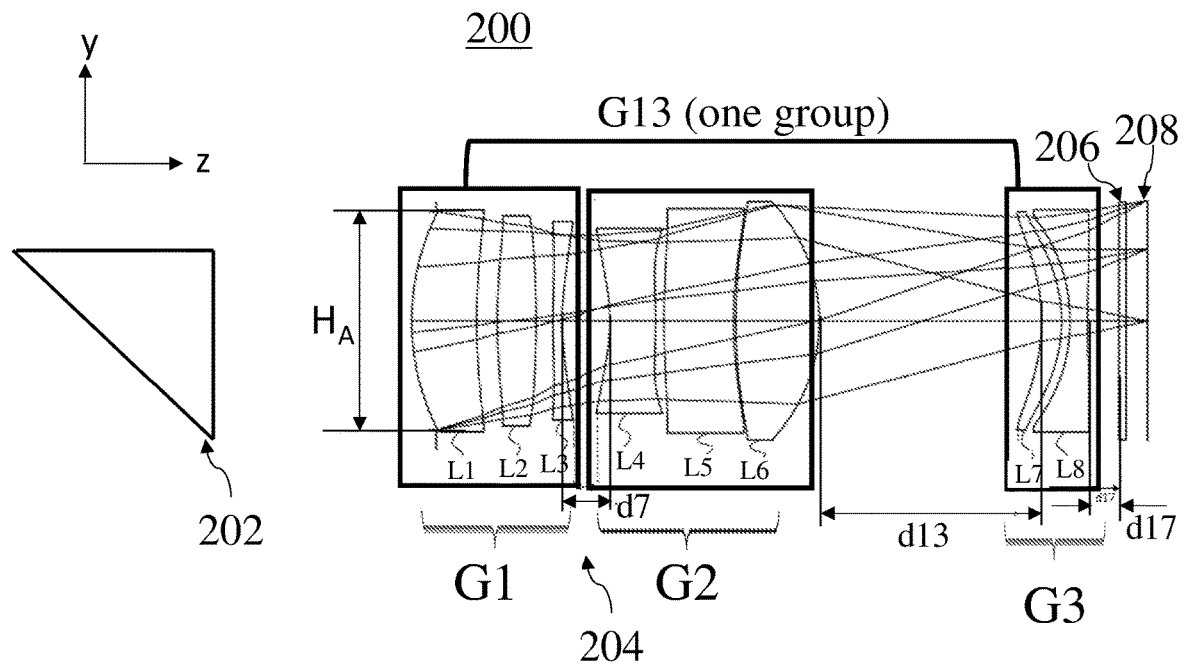
FIG. 2A shows schematically an embodiment of a folded continuous zoom Tele camera ("FCZT camera") disclosed herein in a first, minimal zoom state having an $EFL_{MIN}$.

FIG. 2A shows schematically an embodiment of a FCZT camera disclosed herein and numbered 200 in a first, minimal zoom state (with a minimal zoom factor $ZF_{MIN}$) having a minimal $EFL=EFL_{MIN}$. $EFL_{MIN}$ corresponds to a minimal $ZF_{MIN}$. FCZT camera 200 comprises an OPFE 202, a lens 204, an optical element 206 and an image sensor 208. Camera 200 is shown with ray tracing. Optical element 206 may be optional and may be for example an infra-red (IR) filter, and/or a glass image sensor dust cover. Lens 204 is divided in three lens groups ("G1", "G2" and "G3"), wherein each lens group may include one or more lens elements. All lens elements included in each of G1, G2 and G3 are fixedly coupled to each other, meaning that the lens elements included in each of G1, G2 and G3 can move with respect to other components included in camera 200 (such as image sensor 208) but not with respect to each other within the group. Further, G1 and G3 are fixedly coupled and move together as one group (group "G13" see marked). G2 can move independently of G13 group.

Figure 2B:
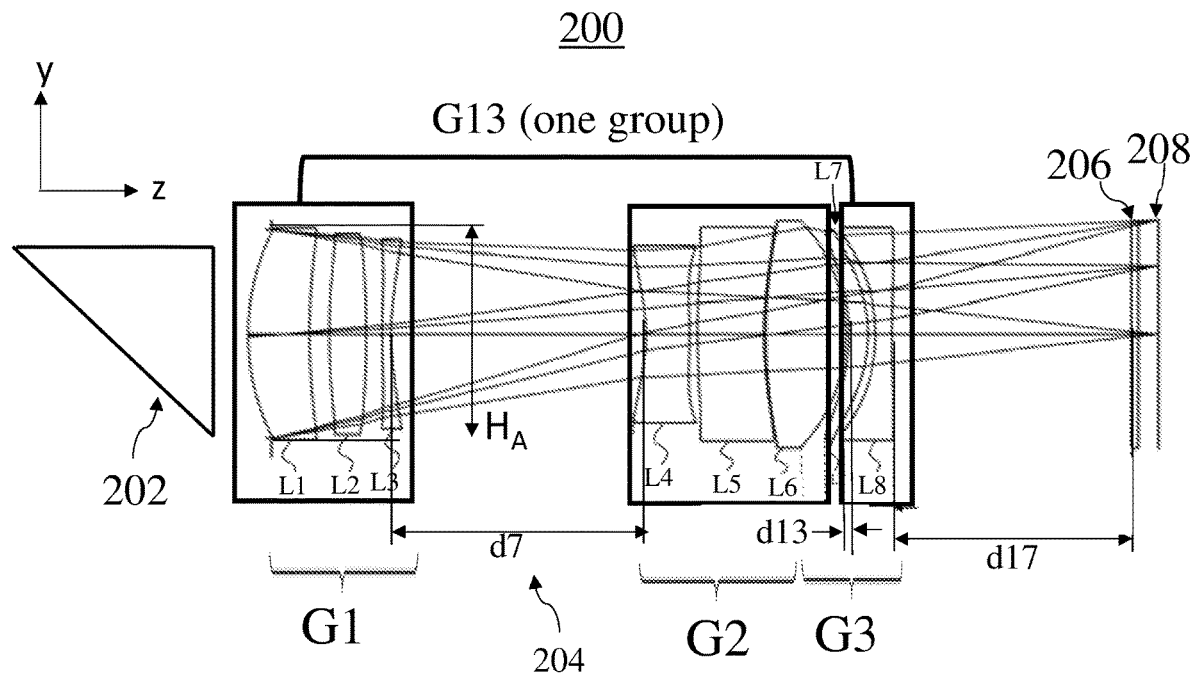
FIG. 2B shows the FCZT CAMERA of FIG. 2A schematically in a second, maximal zoom state having an $EFL_{MAX}$.

FIG. 2B shows FCZT camera 200 schematically in a second, maximal zoom state (with a maximal zoom factor $ZF_{MAX}$) having a maximal EFL $EFL_{MAX}$. The transition or switching from $EFL_{MAX}$ to $EFL_{MIN}$ can be performed continuously, i.e. camera 200 can be switched to any other ZF that satisfies $ZF_{MIN} \leq ZF \leq ZF_{MAX}$ (or $EFL_{MIN} \leq EFL \leq EFL_{MAX}$). This functionality is known in zoom camera lenses that are used for example in relatively large handheld camera devices such as digital single-lens reflex (DSLR) cameras. Camera 200 can provide this known functionality while having size dimensions that allow it be integrated in a camera module such as camera module 300, which fits the size constraints of handheld electronic mobile devices such as smartphones.

For switching ZF, G13 is moved with a large stroke, (e.g. of 3 mm or more, see FIGS. 9A-9C) with respect to G2, OPFE 202 and image sensor 208. G2 is moved with a small stroke (e.g. of 0.15 mm or more, see FIG. 9A-9C) with respect to G13, OPFE 202 and image sensor 208. For focusing, G13 and G2 are moved together as one lens with respect to image sensor 208.

Figure 3A:
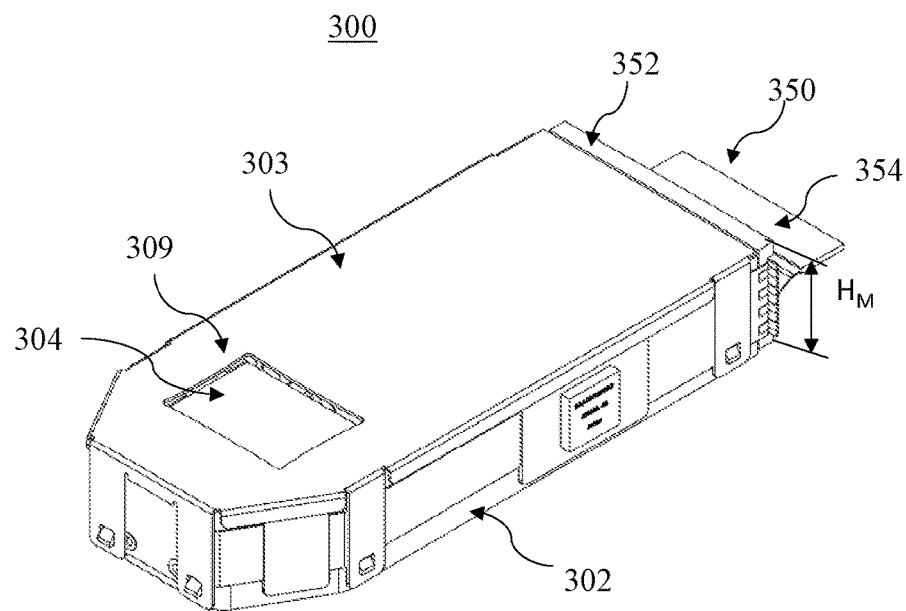
FIG. 3A shows an embodiment of a camera module including a FCZT camera as in FIGS. 2A, 2B in a perspective view.
Figure 3B:
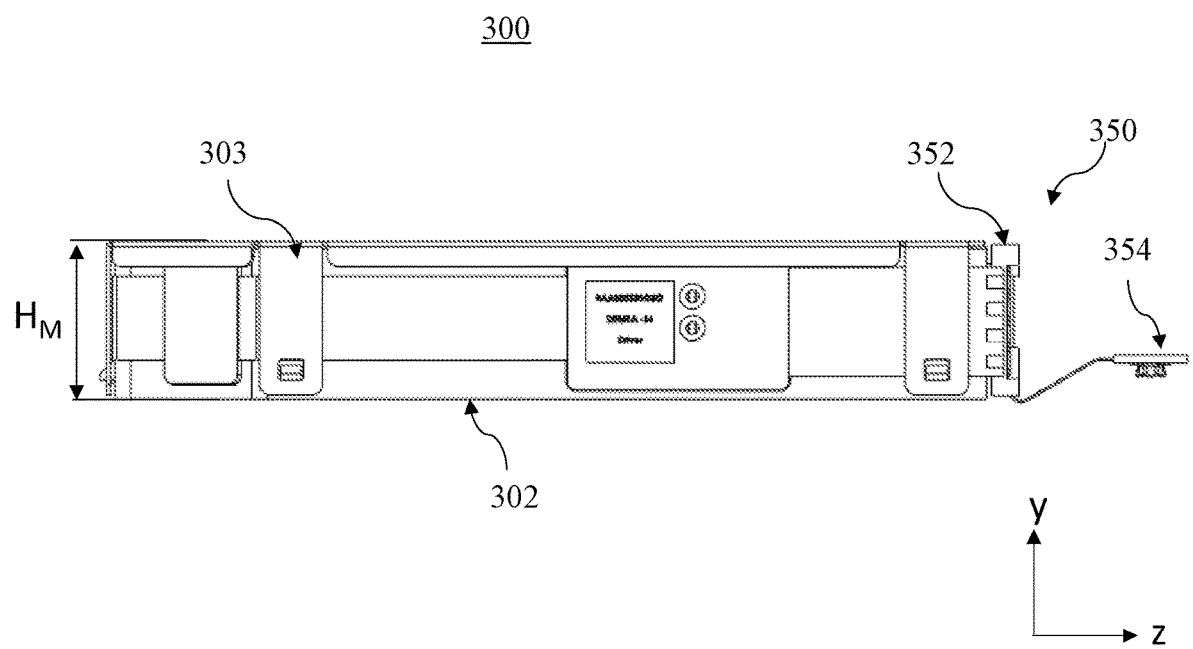
FIG. 3B shows the camera module of FIG. 3A in a side view.
Figure 3C:
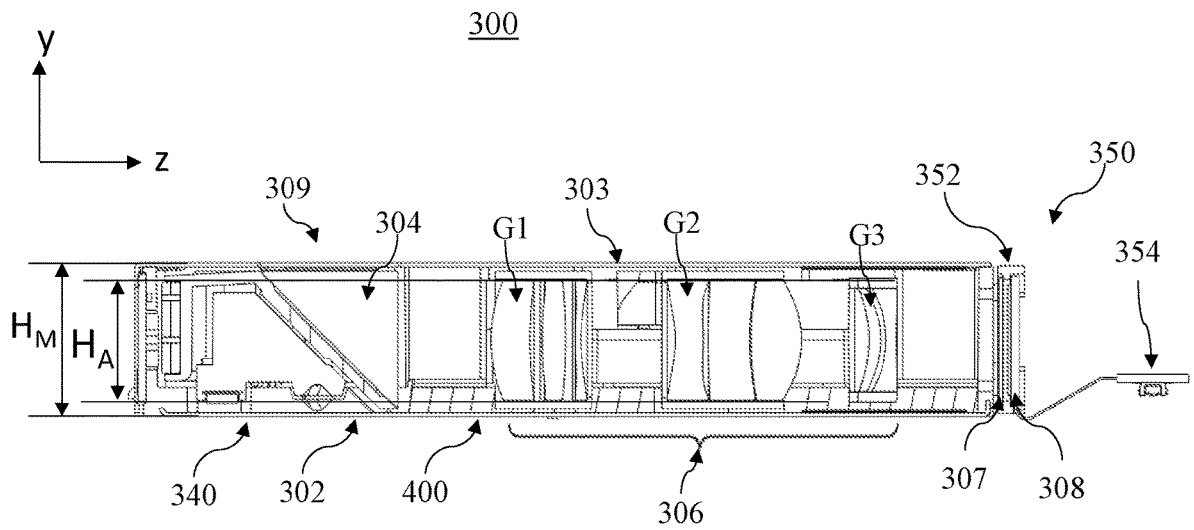
FIG. 3C shows the camera module of FIG. 3A in a cross-sectional view.

FIG. 3A shows an embodiment of a camera module numbered 300 and including a FCZT camera such as FCZT camera 200 in a perspective view. FIG. 3B shows camera module 300 in a side view. FIG. 3C shows camera module 300 in a cross-sectional view.

Camera module 300 comprises an OPFE module 340 with an OPFE 304 (e.g. a prism), and a lens 306 divided into three lens groups G1-G3, G1 312, G2 314 and G3 316. Camera module 300 further comprises a housing 302, a top shield 303, a sensor module 350 that includes an image sensor 308, a sensor module housing 352, a flex cable 354 and an optional optical element 307. Camera module 300 has a module height $H_M$ and includes a camera aperture 309 with an aperture height $H_A$. Aperture height $H_A$ is determined by the optical height ("$H_L$") of the lens element that determines camera 200's aperture stop. Module height $H_M$ and aperture height $H_A$ are both measured along the y-axis in the coordinate system shown, see FIG. 3B and FIGS. 2A-2B. For example, $H_M$ may be 7.5 mm and $H_A$ may be 5.9 mm. In general, $H_M$ may be in the range $H_M$=5 mm-15 mm and $H_A$ may be in the range $H_A$=3 mm-10 mm.

Lens 306 may be a "cut" (or "D-cut") lens as known in the art and shown in FIG. 10A. A cut lens has one or more lens elements Li that are cut, i.e. that have an optical width ("Wu") measured along a first axis perpendicular to the lens optical axis that is larger than an optical height ("$H_{Li\_CUT}$") measured along a second axis perpendicular to the lens optical axis, i.e. $W_{Li} > H_{Li-CUT}$ (see FIG. 10A and cut lens G1 312 in FIG. 4C). For example, a D-cut ratio of a cut lens may be 0%-50%, meaning that $W_{Li}$ may be larger than Hu by 0%-50%, i.e. $W_{Li} = H_{Li\_CUT} - 1.5 \cdot H_{Li-CUT}$. The cutting may reduce module height $H_M$ of the camera module above. This allows to realize a slim FCZT camera having a low $H_M$ to render it compatible with smartphone size constraints and having a relatively large aperture area, which is beneficial for achieving a low f/#camera having a relatively large signal-to-noise ratio ("SNR"). One may refer to the difference between $H_M$ and $H_A$ as a "height penalty" ("P") of the camera module, where P is to be minimized for a slim camera with relatively large SNR. Further design choices for minimizing penalty P are:

Top shield 303 may be made of metal and may have a low height (measured along the y-axis) or thickness of about 0.05 mm-0.25 mm, and in particular about 0.1 mm-0.2 mm. In general, metal parts have the benefit that they can be produced at lower height than plastics part.

Yoke 400 is located (see FIG. 4D) at a bottom part of housing 302 with lowest height (measured along the y-axis) or thickness. Yoke 400 may be made of a magnetic metal and may have a low height of about 0.05 mm-0.25 mm.

Figure 4A:
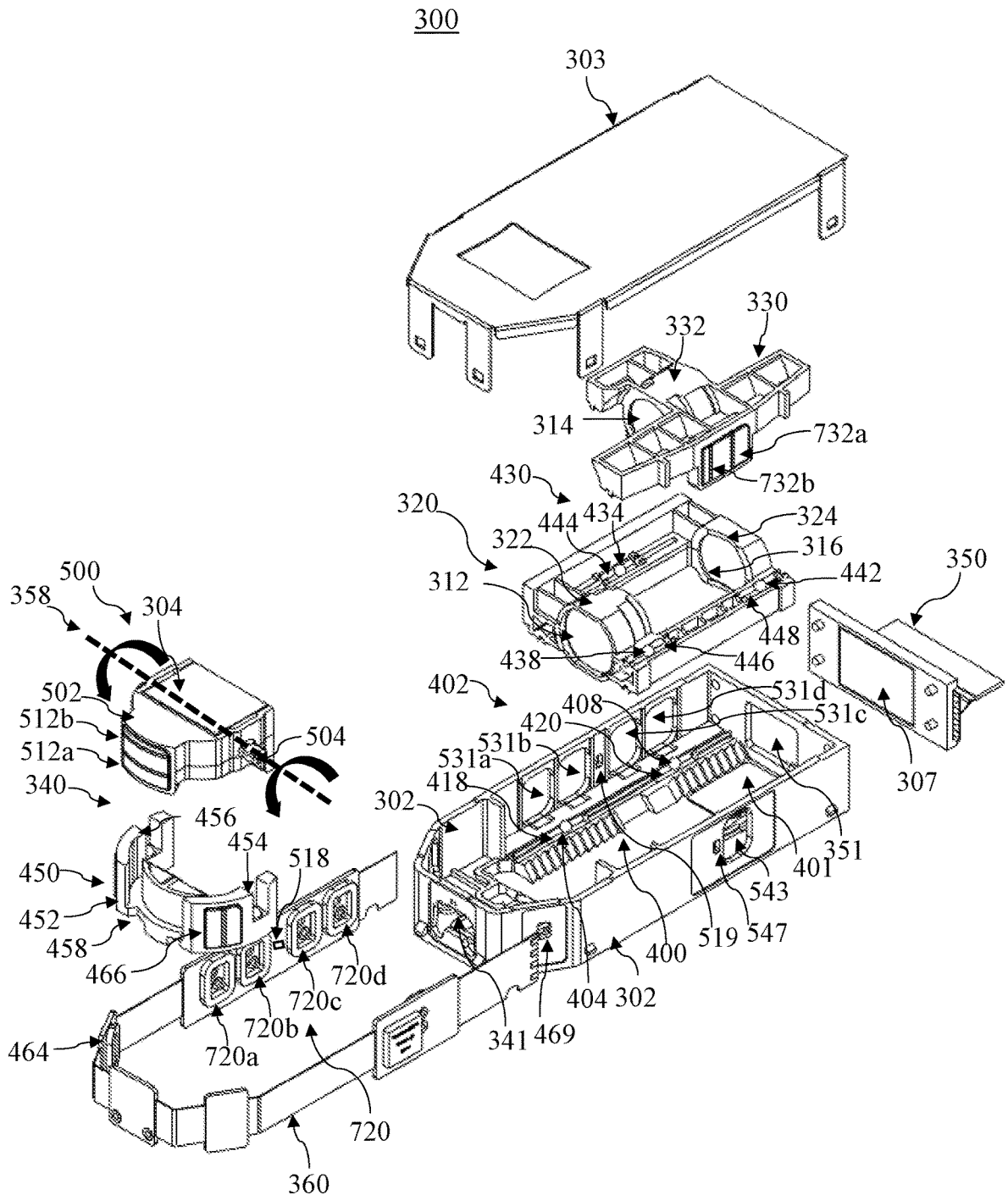
FIG. 4A shows the camera module of FIG. 3A in one exploded view.
Figure 4B:
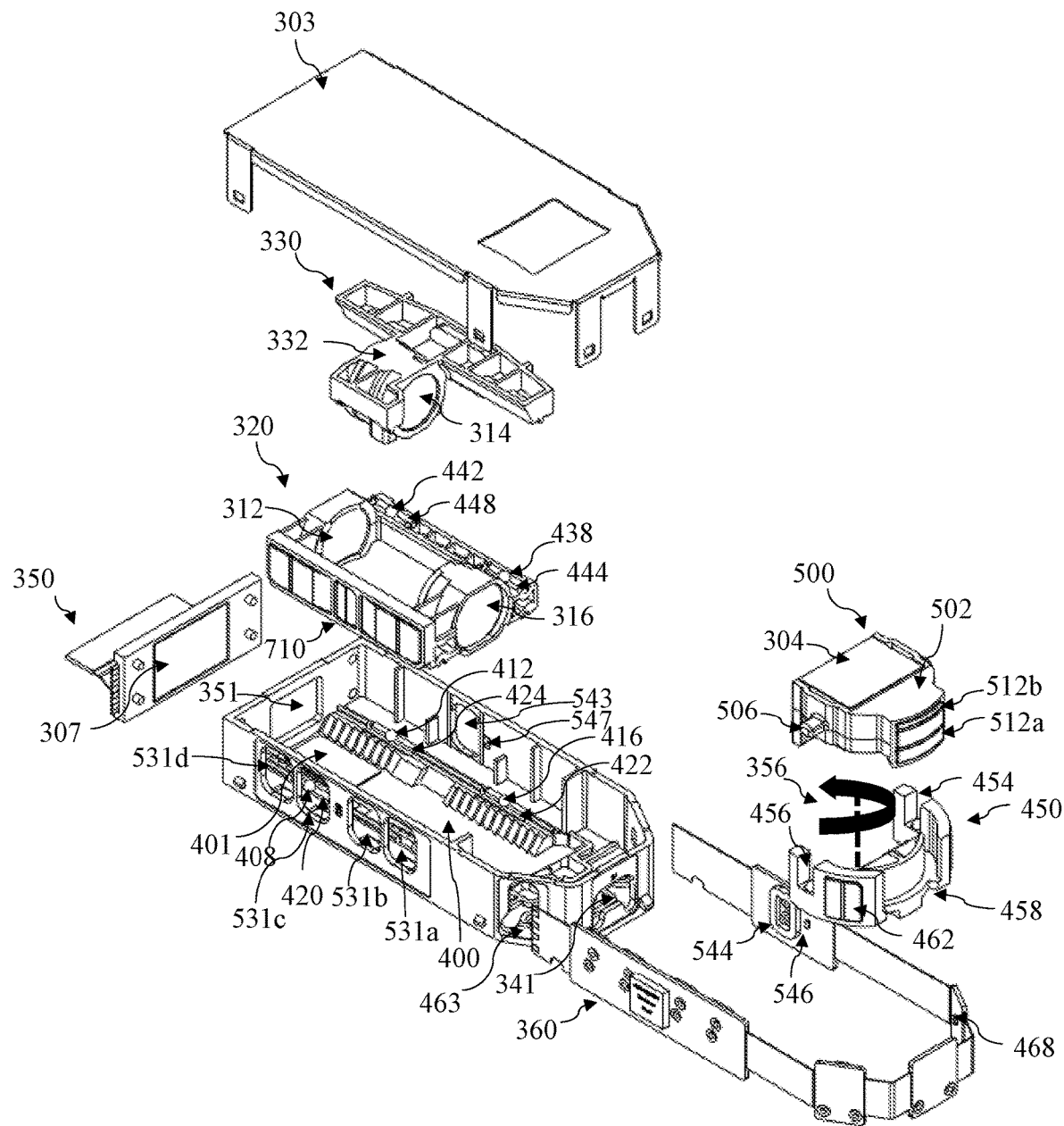
FIG. 4B shows the camera module of FIG. 3A in another exploded view.
Figure 4C:
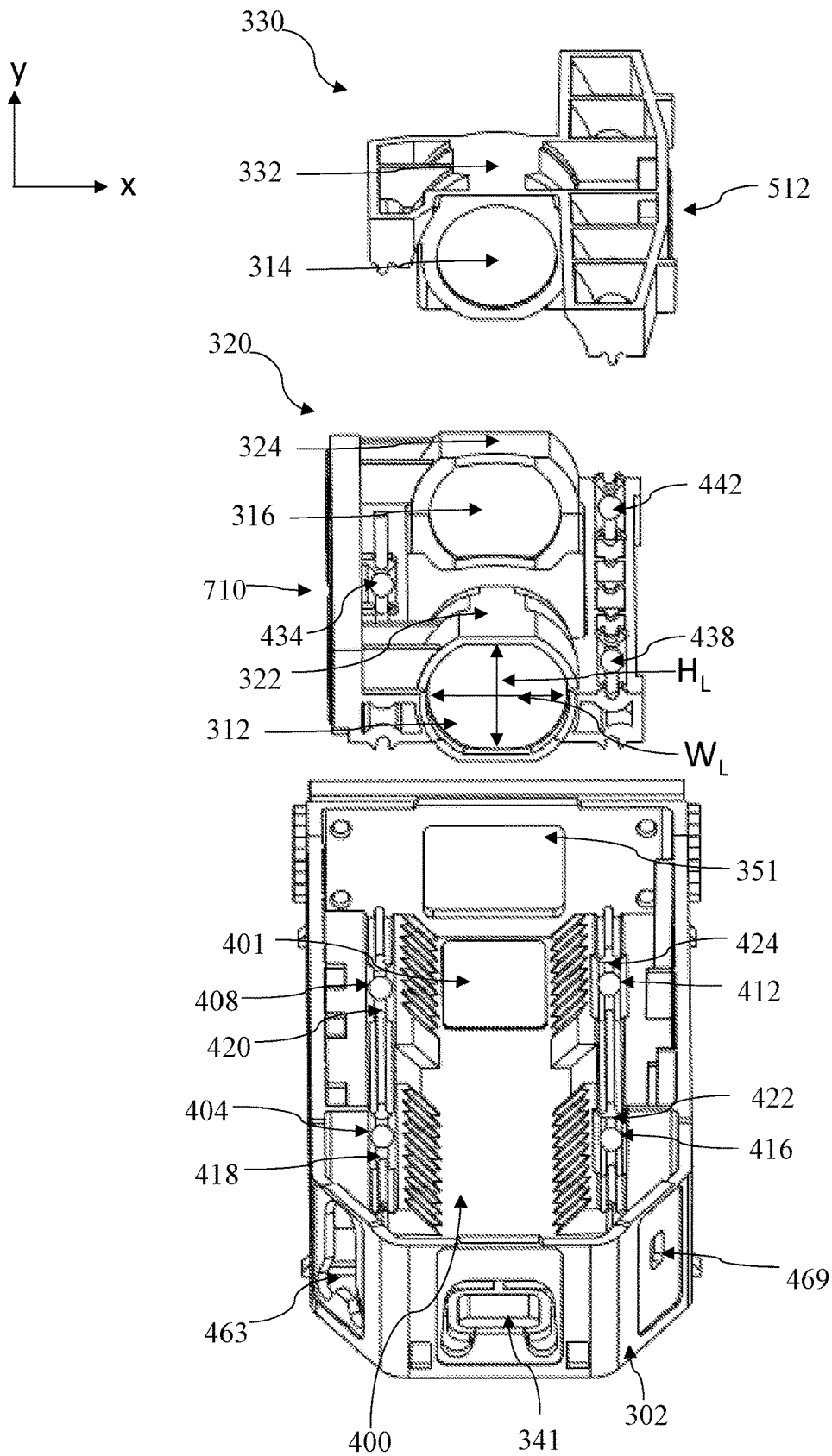
FIG. 4C shows details of the exploded camera module of FIG. 4A in one perspective view.

As visible in FIG. 4C, a height of G13 carrier 320 and G2 carrier 330 is defined by $H_L$. That is, G13 carrier 320 and G2 carrier 330 do not include any additional parts that have a height which exceeds the height of a G1 barrel 322, a G2 barrel 332 and G3 barrel 324. For example, the height of G1 barrel 322 is given by the sum of $H_L$, twice the G1 barrel thickness of e.g. 0.1 mm-0.5 mm and two air gaps having an air gap height of about 0.1 mm (a first air gap being located between G13 barrel 322 and top shield 303, a second air gap being located between G13 barrel 322 and housing 302).

In some examples (not shown), prism 304 may be a cut prism as known in the art and shown in FIG. 11. A D-cut ratio of a cut prism may for example be 0%-50%, i.e. a prism optical width $W_P$ may be larger than a prism optical height $H_{P\text{-}CUT}$ by 0%-50%.

Figure 3D:
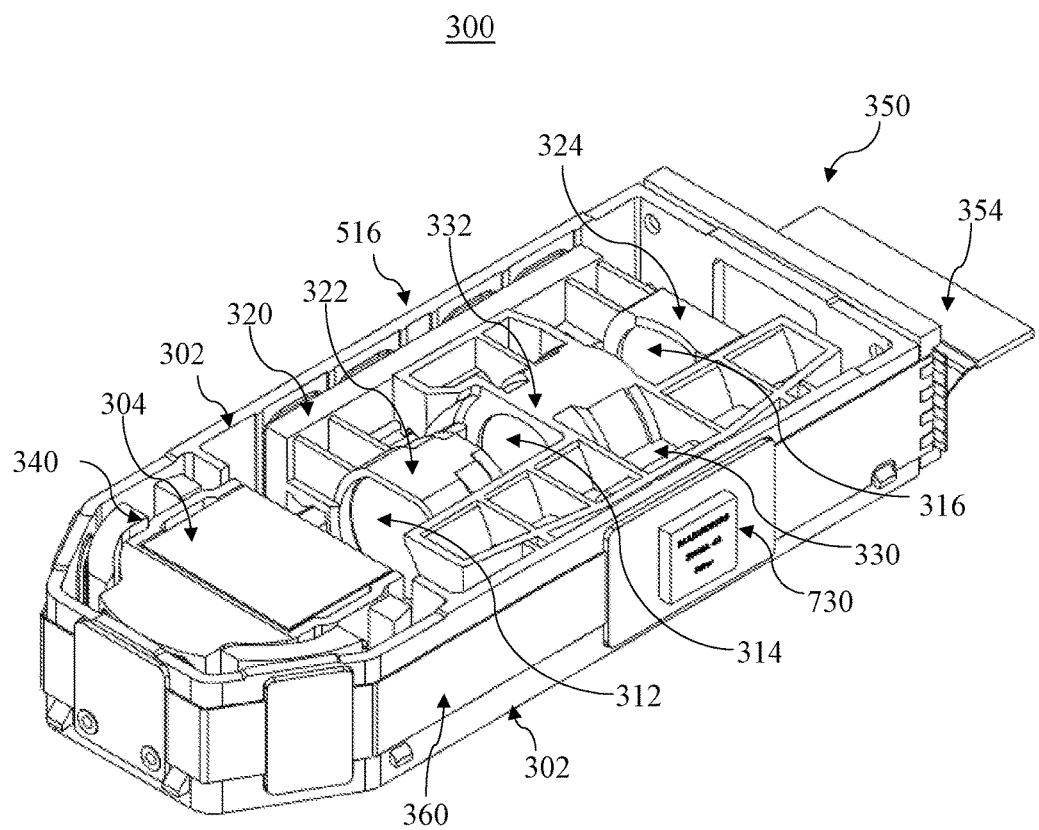
FIG. 3D shows the camera module of FIG. 3A in a perspective view without a top shield.

FIG. 3D shows camera module 300 from FIG. 3A-3C in a perspective view and without top shield 303. A tape 360 that includes several components (see below) is fixedly attached to camera module 300. G1 312, G2 314 and G3 316 are included in, respectively, G1 barrel 322 (part of G13 carrier 320), G2 barrel 332 (part of G2 carrier 330) and G3 barrel 324 (part of G13 carrier 320). The locations of G13 actuator 516 and a G2 actuator 730 are shown, although they are only partly visible here (but see FIGS. 7A-B). G13 actuator 516 comprises a G13 magnet module 710, a G13 coil module 720 and a G13 position sensor 518. G2 actuator 730 comprises a G2 magnet 732, a G2 coil 544 and a G2 position sensor 546. If not stated otherwise explicitly, all actuators described herein may be voice coil motors ("VCMs").

Figure 4D:
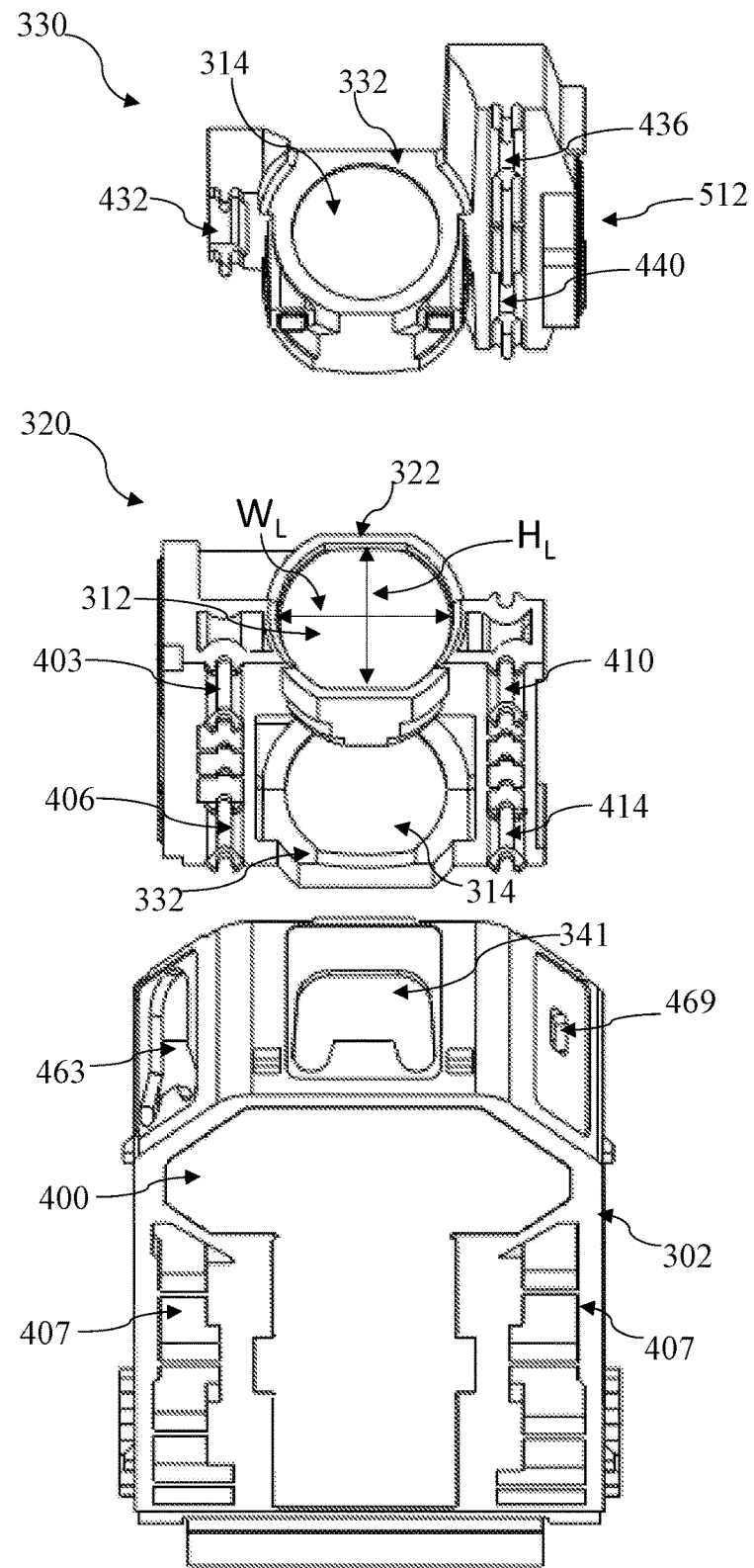
FIG. 4D shows details of the exploded camera module of FIG. 4A in another perspective view.

FIG. 4A shows camera module 300 in one exploded view, with tape 360, G13 carrier 320, G2 carrier 330 and housing 302 visible. FIG. 4B shows camera module 300 from FIG. 4A in another exploded view. FIG. 4C shows camera module 300 in one perspective view. FIG. 4D shows camera module 300 in another perspective view. The description next refers to these figures.

Camera module 300 includes a cut lens G1 312 that has an optical width $W_L$ measured along the x axis which is larger than an optical height $H_{L\text{-}CUT}$ measured along the y axis (see FIG. 4C for coordinate system).

OPFE module 340 can perform OIS for compensating undesired handshake of a mobile device such as a smartphone that includes camera module 300. The OIS may be performed along two rotation axes, a yaw axis 356 and a pitch axis 358. OPFE module 340 includes a yaw stage 450 and a pitch stage 500. Yaw stage 450 includes a yaw stage housing 452, a first groove 454 and a second groove 456 for carrying pitch stage 500, a notch 458 for inserting pitch stage 500 into yaw stage 450, a yaw actuation magnet 462 (not visible here) and a sensing magnet 466. Pitch stage 500 includes a pitch stage housing 502, a first pin 504, a second pin 506 (not visible here) and a pitch magnet 512. The pins are located respectively in first groove 454 and second groove 456 and used to mediate the rotational motion of pitch stage 500. Pitch magnet 512 is divided into an actuation magnet 512a and a sensing magnet 512b, which enables a pitch position sensor 514 to be located outside of a pitch coil 513. This is beneficial, because pitch position sensor 514 is thus less influenced by the magnetic field and the heat that is induced when operating (i.e. driving a current through) pitch coil 513, improving its accuracy for sensing the position of pitch sensing magnet 512b, which is the relevant magnetic field to be measured.

Tape 360 includes a yaw actuation coil 464 and a yaw position sensor 468 (FIG. 4B). Together with yaw actuation magnet 462 and yaw sensing magnet 466, yaw actuation coil 464 and a yaw position sensor 468 form a yaw stage actuator 460 that actuates a movement required for OIS along the yaw direction. Tape 360 further includes a G13 coil module 720 with four coils 720a-720d. A G13 magnet module 710 (see FIG. 7A), G13 position sensor 518 and G13 coil module 720 together form G13 actuator 516, which linearly actuates G13 carrier 320 along the optical axis of lens 306.

A G2-G13 mechanism 430 mediates the movement between G13 carrier 320 and G2 carrier 330. Mechanism 430 includes three G2 carrier grooves 432, 436 and 440 (not visible here, see FIG. 4D) that are included in G2 carrier 330, and three G13 carrier grooves 444, 446 and 448 that are included in G13 carrier 320. A first ball 434 is included in a first space defined by a first volume formed by G2 carrier groove 432 and G13 carrier groove 444, a second ball 438 is included in a second space defined by a second volume formed by G2 carrier groove 436 and G13 carrier groove 446 and a third ball 442 is included in a third space defined by a third volume formed by G2 carrier groove 440 and G13 carrier groove 448. The spaces form rails that are used to define the position of G2 relative to G13. The position of G2 relative to G13 defines the EFL (i.e. the ZF) of the camera.

A housing—G13 mechanism 402 mediates the movement between image sensor 308 (which is fixedly coupled to housing 302) and G13 carrier 320. The position of G13 relative to the image sensor defines the focus state of the camera. Mechanism 402 includes four G13 carrier grooves 403, 406, 410 and 414 (not visible here, see FIG. 4D) that are formed in in G13 carrier 320, and four housing grooves 418, 420, 422 and 424 that are formed in housing 302 (not all visible here, see FIG. 4B). A first ball 404 is included in a space formed by G13 carrier groove 403 and housing groove 418, a second ball 408 is included in a space formed by G13 carrier groove 406 and housing groove 420, a third ball 412 is included in a space formed by G13 carrier groove 410 and housing groove 422, and a fourth ball 416 is included in a space formed by G13 carrier groove 414 and housing groove 424. The spaces form rails that are used to define the position of G13 relative to housing 302 and image sensor 308.

Housing 302 includes a yoke 400, which, together with one yaw stage connector magnet 496 (see FIG. 5B) and two pitch stage connector magnets 492 and 494 (see FIG. 5B), connects yaw stage 450 and pitch stage 500 respectively to housing 302. Yoke 400 also connects housing 302 and G2 carrier 330 via two G2 carrier connector magnets 602 and 604 (see FIG. 6B).

Figure 5A:
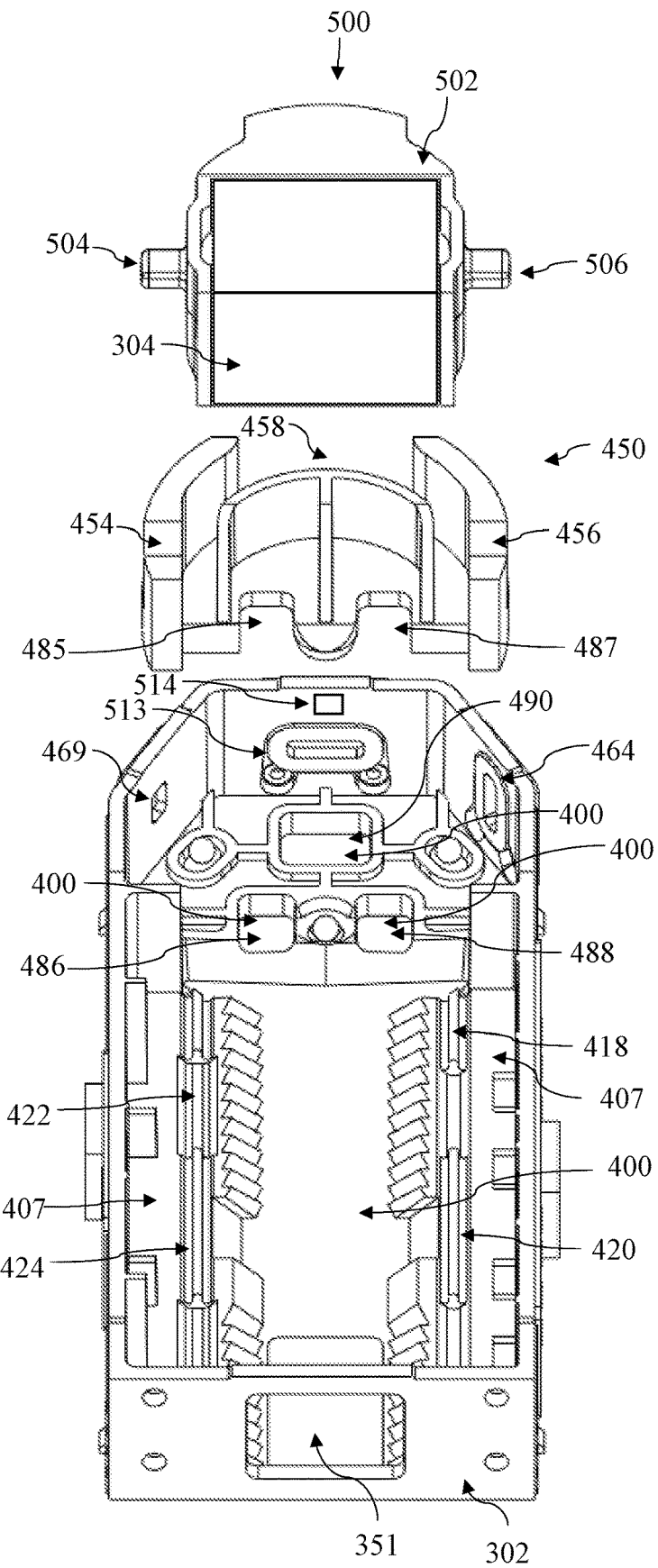
FIG. 5A shows parts of the camera module of FIG. 3A in a perspective view.

As visible in FIG. 4D, bottom part of housing 302 includes besides yoke 400, also a plastic part 407. A stray light preventing pad 401 absorbs stray light, to prevent stray light from reaching image sensor 308. Housing 302 includes several notches or windows, see next. The notches allow the components that are located within the volume of housing 302 to communicate or interact with components that are located outside of the volume of housing 302:

A pitch notch 341: allows pitch magnet 512 located inside housing 302 to communicate with pitch coil 513 and pitch position sensor 514 located outside housing 302 (not visible here, see FIG. 5A).

G2 actuator notch 543: allows G2 magnet 732 located inside housing 302 to communicate with G2 coil 544 located outside housing 302.

A G2 sensing notch 547: allows G2 magnet 732 located inside housing 302 to communicate with G2 position sensor 546 located outside housing 302.

A sensor window 351: allows light passing lens 306 to reach image sensor 308.

A yaw sensing notch 469: allows yaw sensing magnet 466 located inside housing 302 to communicate with yaw position sensor 468 located outside housing 302.

A yaw actuation notch 463: allows yaw actuation magnet 462 located inside housing 302 to communicate with yaw actuation coil 464 located outside housing 302.

Four G13 carrier actuation notches 531a-531d: allow G13 magnet module 710 located inside housing 302 to communicate with G13 coil module 720 located outside housing 302.

A G13 sensing notch 519: allows G13 magnet module 710 located inside housing 302 to communicate with G13 position sensor 518 located outside housing 302.

Two pitch stage notches 486 and 488 (not visible here, see FIG. 5A): allow two pitch stage connector magnets 492 and 494 located inside housing 302 to communicate with yoke 400 located outside housing 302.

A yaw stage notch 490 (not visible here, see FIG. 5A): allows yaw stage connector magnet 496 located inside housing 302 to communicate with yoke 400 is located outside housing 302.

Figure 5B:
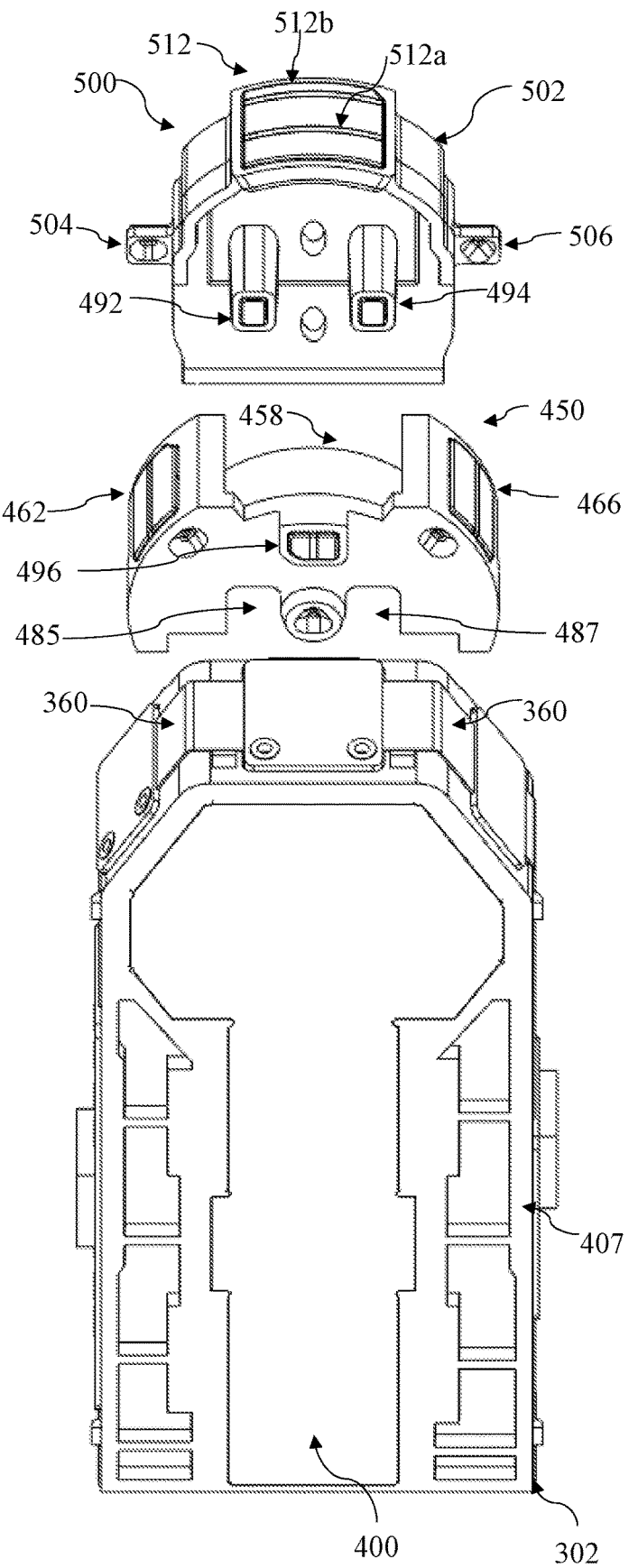
FIG. 5B shows parts of camera module FIG. 3A in yet another perspective view.

FIG. 5A shows parts of camera module 300 in one perspective view, while FIG. 5B shows them in another perspective view. Two pitch stage notches 486 and 488 and a yaw stage notch 490 are visible. The pitch stage notches allow pitch stage connector magnets 492 and 494 respectively to connect to yoke 400, so that a magnetic force attracts pitch stage 500 towards housing 302. The yaw stage notch allows yaw stage connector magnet 496 to connect to yoke 400, so that a magnetic force attracts pitch stage 500 towards housing 302. Yoke 400 extends over a significant bottom area of housing 302, as shown.

Figure 6A:
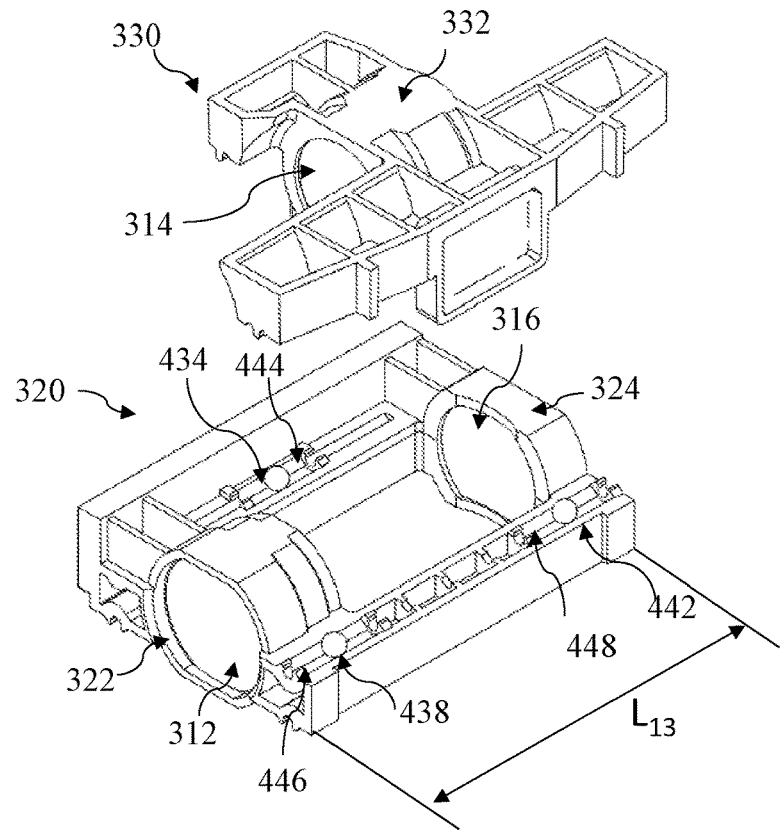
FIG. 6A shows the G13 carrier and the G2 carrier of the FCZT camera of FIGS. 3A-3C in a first exploded view.
Figure 6B:
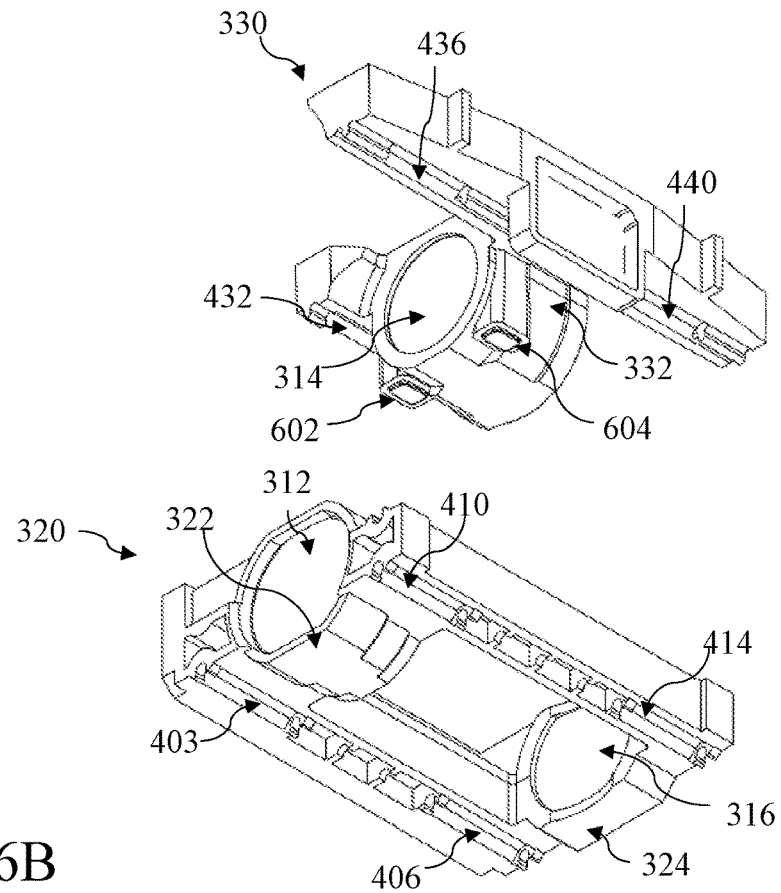
FIG. 6B the G13 carrier and the G2 carrier of the FCZT camera of FIGS. 3A-3C in a second exploded view.

FIG. 6A shows G13 carrier 320 and G2 carrier 330 in a first exploded view. FIG. 6B shows G13 carrier 320 and G2 carrier 330 in a second exploded view. The movement of G2 carrier 330 is ball-guided by the three balls 434, 438 and 442. Two balls 438 and 442 are located at a first side ("2× balls") and one ball 434 is located at a second side ("1× ball"). The 2× balls are located far from each other with respect to a length $L_{13}$ of G13 carrier 320, e.g. a distance d between the balls 438 and 442 may be $d > 0.5 \cdot L_{13}$ or $d > 0.75 \cdot L_{13}$. Here, $L_{13} = 20$ mm. This is beneficial as it allows high angular accuracy when switching between different ZFs. Here, "high angular accuracy" (e.g. an angular accuracy of less than 0.3 degree or even less than 0.1 degree) means that a given positioning error of positioning G13 carrier 320 and G2 carrier 330 relative to each other results in a small angular error (i.e. an error within the angular accuracy) only. The 1× ball may be located close to the center of G13 carrier 320. Here, "close to the center" may mean not farther than a distance d of $d < 0.25 \cdot L_{13}$ from the center of G13 carrier 320.

Figure 7A:
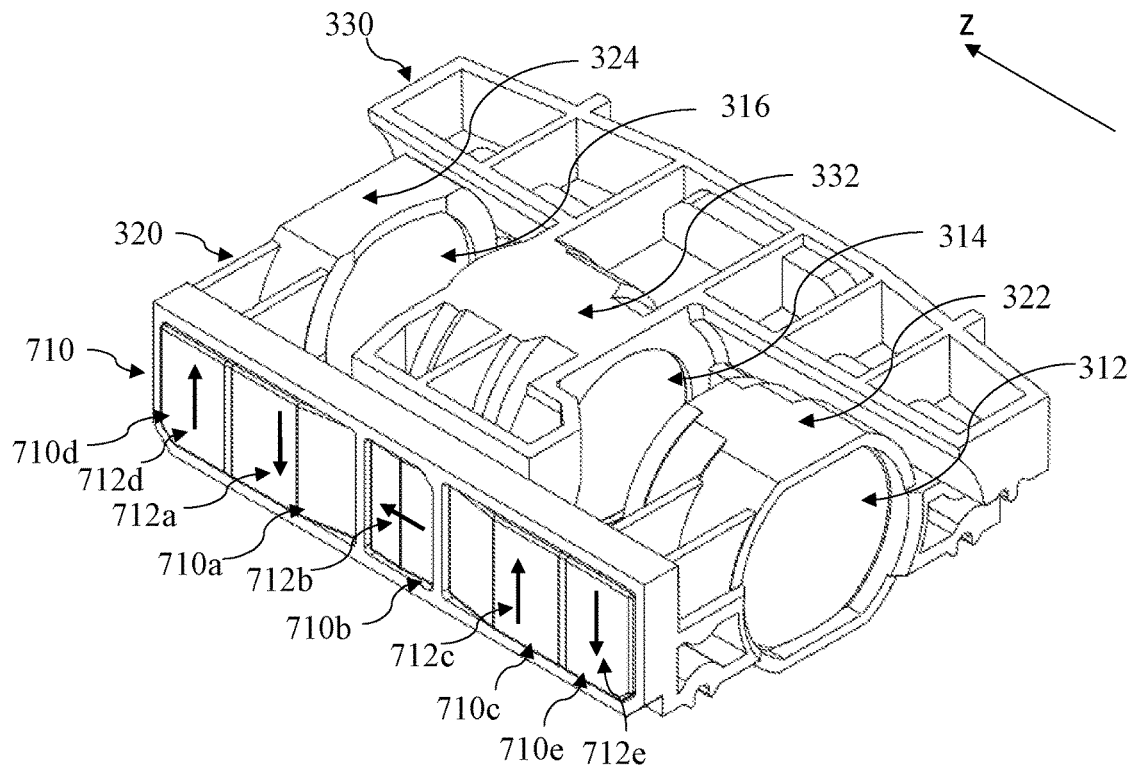
FIG. 7A shows the G13 carrier and the G2 carrier of the FCZT camera of FIGS. 3A-3C in a first perspective view.
Figure 7B:
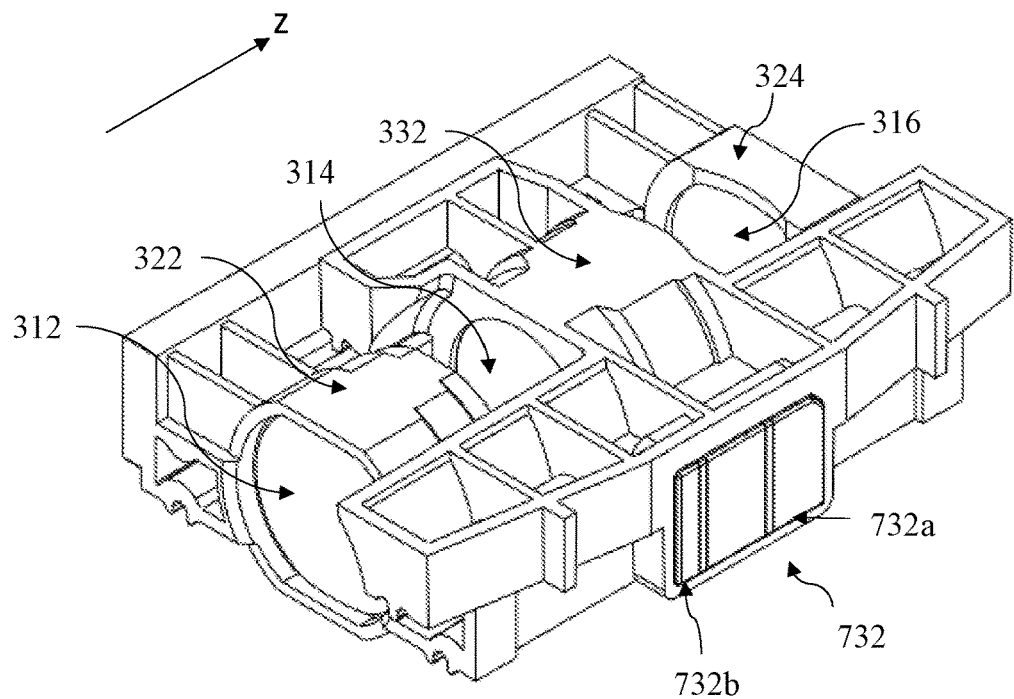
FIG. 7B shows the G13 carrier and the G2 carrier of the FCZT camera of FIGS. 3A-3C in a second perspective view.

FIG. 7A shows G13 carrier 320 and G2 carrier 330 in a first perspective view. FIG. 7B shows G13 carrier 320 and G2 carrier 330 in a second perspective view. The z axis from the coordinate system of FIG. 3B-3C is shown. The optical axis of lens 306 is substantially parallel to the z axis. G2 magnet 732 includes an actuation magnet part 732a and a sensing magnet part 732b. Measured along an axis parallel to the z axis, the actuation magnet part is larger than the sensing magnet part. An advantage of dividing G2 magnet 732 into an actuation part and a sensing part is that G2 position sensor 546 can be located outside of G2 coil 544. This is beneficial, since G2 position sensor 546 is less impacted by both the magnetic field created by coil 544 as well as by G2 coil 544's elevated temperature resulting from driving an electric current through G2 coil 544.

G2 actuator 730 actuates G2 carrier 330 linearly along the optical axis of lens 306 by relatively small actuation strokes (or ranges) with respect to image sensor 308, for example 0.2 mm-3 mm, and in particular over 1.5 mm.

G13 magnet module 710 includes five magnets 710a-710e having five respective magnet polarizations 712a-712e as shown. Together with G13 coil module 720 and G13 position sensor 518, G13 magnet module 710 forms G13 actuator 516. G13 actuator 516 actuates G13 carrier 320 along relatively large actuation strokes (or ranges) with respect to image sensor 308 for example 2 mm-15 mm, and in particular over 5 mm, and with large magnet slope (or gradient) for robust actuation control. Such a VCM is disclosed in the position sensing unit and the VCM shown in FIG. 5 of the co-owned international patent application PCT/IB2021/056693, which is incorporated herein by reference in its entirety.

Figure 9A:
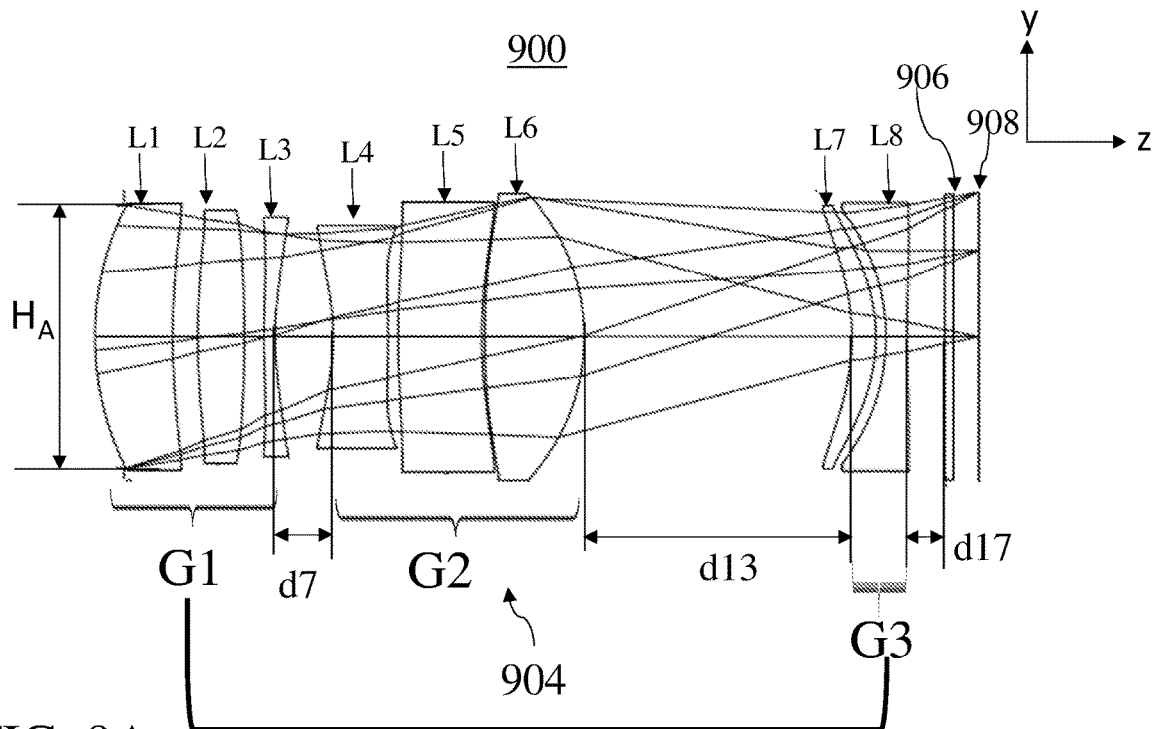
FIG. 9A shows an optical lens system in a first, minimal zoom state having an $EFL=EFL_{MIN}=15$ mm.
Figure 9B:
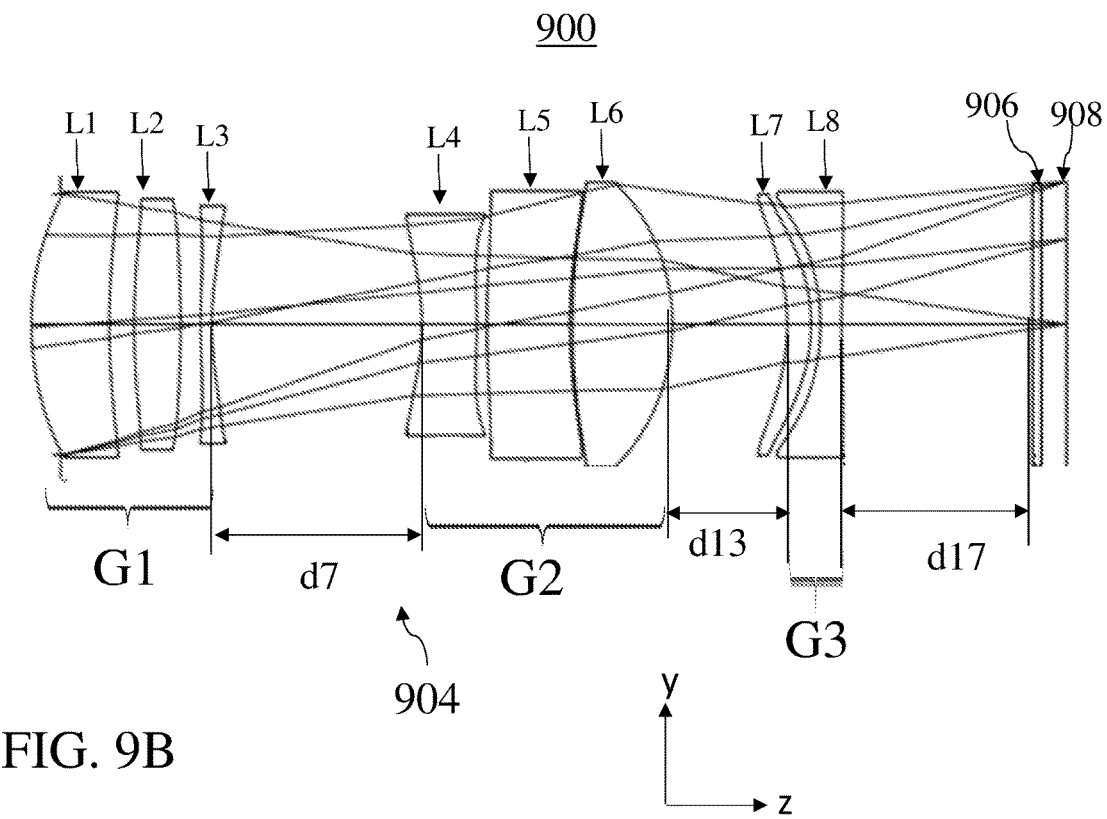
FIG. 9B shows the optical lens system of FIG. 9A in a second, intermediate zoom state having an EFL=22.5 mm.
Figure 9C:
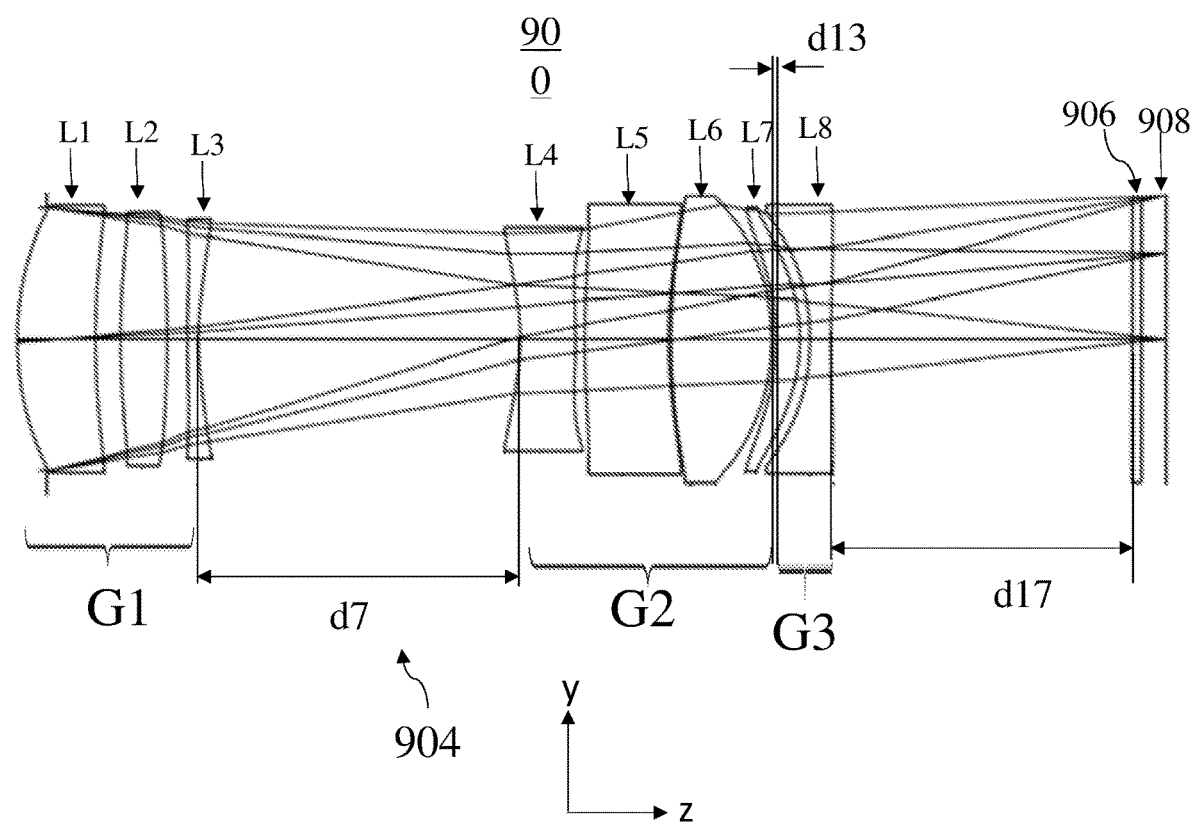
FIG. 9C shows the optical lens system of FIG. 9A in a third, maximum zoom state having an $EFL=EFL_{MAX}=30$ mm.

The movement required for switching FCZT camera 200 between two different ZFs in a continuous set of ZF states can be described in two steps. For simplicity and exemplarily, we refer here to switching optical lens system 900 from $ZF_{MIN}$ (see FIG. 9A) to $ZF_{MAX}$ (see FIG. 9C):

1. In a first step, G13 actuator 516 moves G13 carrier 320 along a relatively large G13 carrier stroke with respect to image sensor 308.
2. In this first step, G2 carrier 330 does not move with respect to image sensor 308. This is achieved by G2 actuator 730 keeping G2 carrier 330 in a same distance from image sensor 308. The movement of G13 carrier 320 with respect to image sensor 308 means that here is a relative movement of G13 carrier 320 (including G13 lens group) and G2 carrier 330 (including G2 lens group). As can be seen in FIG. 9A-C, this relative movement between G13 and G2 defines a ZF of FCZT camera 200.
3. In a second step, G2 actuator 730 moves G2 carrier 330 along a relatively small stroke with respect to image sensor 308. It is noted that the movement described in the first step and the movement described in the second step may be performed sequentially or simultaneously. For switching FCZT camera 200 to any other ZF, the same movements are performed, but with different stroke values.

Figure 8A:
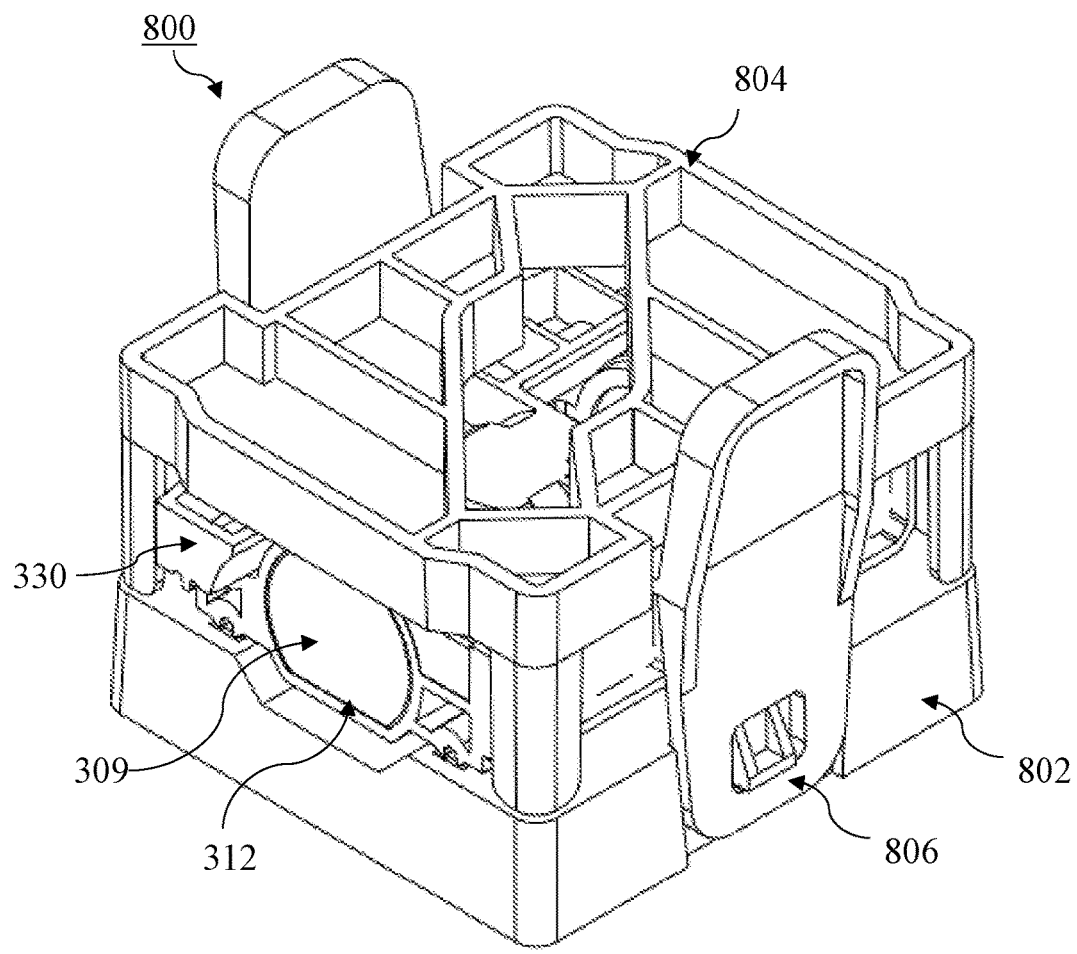
FIG. 8A shows a lens transporter for testing and shipping a lens of a FCZT CAMERA disclosed herein.
Figure 8B:
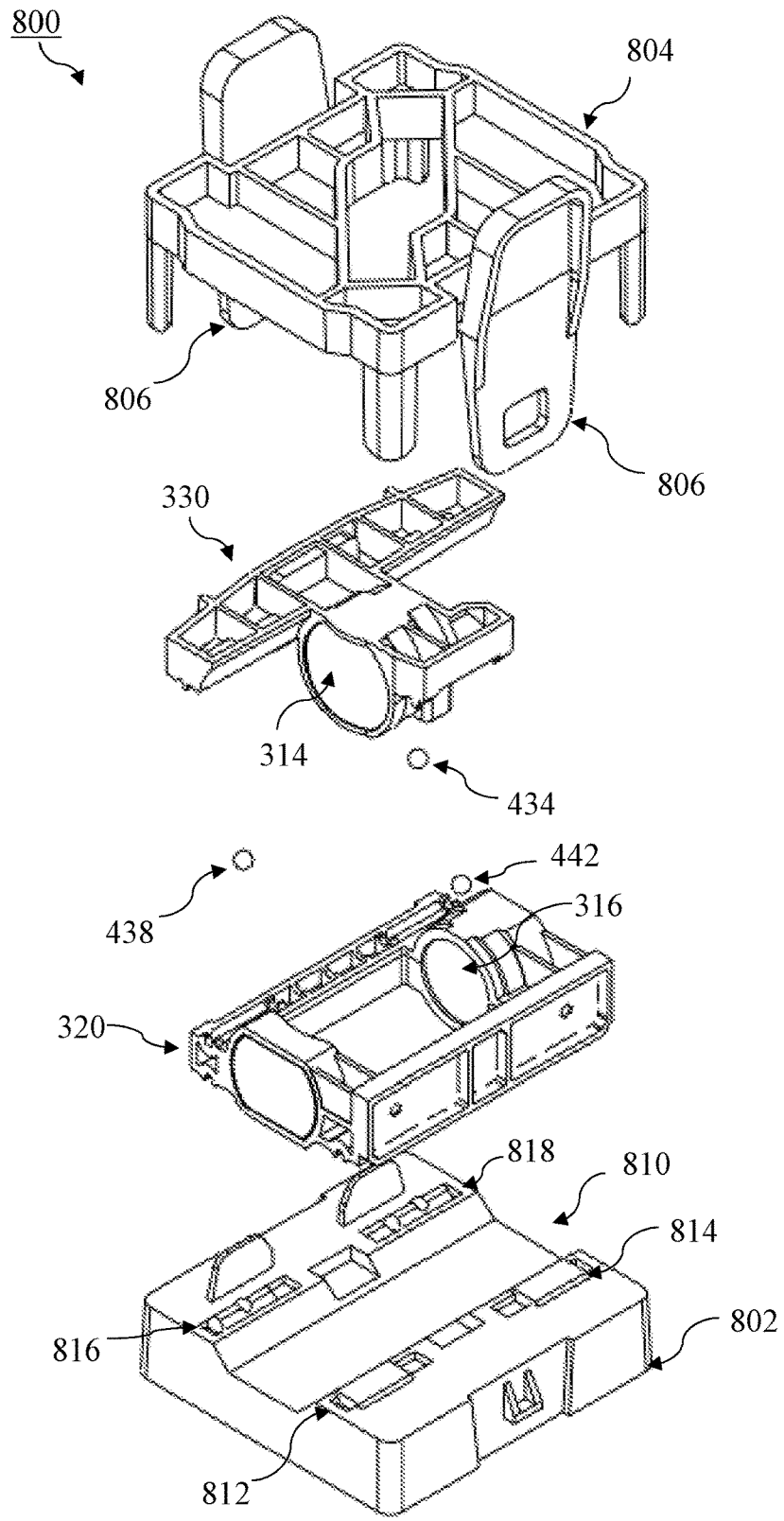
FIG. 8B shows the lens transporter of FIG. 8A in an exploded view.

FIG. 8A shows a lens transporter 800 for testing and shipping a lens of a FCZT camera such as lens 204 of FCZT camera 200 as disclosed herein. Lens transporter 800 includes a fixture base 802, a preload cover 804 and a locker 806. FIG. 8B shows lens transporter 800 including a G13 carrier and a G2 carrier in an exploded view. Fixture base 802 includes a G13 groove locker 810. G13 groove locker 810 includes four lockers, 812, 814, 816 and 818, which enter G13 grooves 403, 406, 410 and 414 respectively. G13 groove locker 810 fixes the particular G13 carrier into fixture base 802, e.g. it prevents it from moving.

A particular pair of one G13 carrier such as G13 carrier 320 and one G2 carrier such as G2 carrier 330 can be inserted into lens transporter 800. The particular G2 carrier and the particular G13 carrier form a particular "lens pair". Aperture 309 of lens 306 is visible and is not covered by any component included in lens transporter 800. When lens transporter 800 with a particular lens pair is locked by locker 806, it keeps (or locks) the particular lens pair in a certain lens configuration, such that the particular lens pair (and the particular lens it forms) is fixed at a particular zoom factor.

A routine for testing and shipping the particular lens may be as follows: at the lens manufacturer, one may ensure that the particular lens pair satisfies a specific set of optical specifications. For the optical testing, in the shown configuration, aperture 309 is accessible for optical investigations. Given that specific optical specifications are fulfilled, lens transporter 800 including the particular lens pair of the particular G13 carrier and the particular G2 carrier is shipped to a camera manufacturer. The camera manufacturer can easily perform another optical investigation which may be independent of the investigation performed by the lens manufacturer by using lens transporter 800 including the particular lens pair as shipped. Given that specific optical specifications are found to be fulfilled, the camera manufacturer may assemble the particular lens pair in a FCZT camera.

FIG. 9A-9C shows an optical lens system 900 disclosed herein that may be included into a FCZT camera like camera 200. FIG. 9A shows optical lens system 900 in a first, minimal zoom state having an $EFL_{MIN}$=15 mm. FIG. 9B shows optical lens system 900 in a second, intermediate zoom state having an EFL=22.5 mm (which corresponds to $(EFL_{MAX}-EFL_{MIN})/2$). FIG. 9C shows optical lens system 900 in a third, maximum zoom state having an $EFL_{MAX}$=30 mm. The transition or switching from $EFL_{MAX}$ to $EFL_{MIN}$ or vice versa can be performed continuously, i.e. a FCZT camera such as FCZT camera 200 including system 900 can be switched to any other ZF that satisfies $ZF_{MIN} \leq ZF \leq ZF_{MAX}$ (or $EFL_{MIN} \leq EFL \leq EFL_{MAX}$).

Optical lens system 900 comprises a lens 904, an optical element 906 and an image sensor 908. System 900 is shown with ray tracing. Optical element 906 is optional and may be for example an infra-red (IR) filter, and/or a glass image sensor dust cover. Like lens 204, lens 904 is divided into three lens groups G1, G2 and G3. G1 includes (in order from an object to an image side of optical system 200) lens elements L1-L3, G2 includes lens elements L4-L6 and G3 includes lens elements L7-L8. The lens elements included in each lens group are fixedly coupled to each other. As in lens 204, here too G1 and G3 are fixedly coupled and move together as one group G13, while G2 can move independently. Distances between the lens groups are marked d7 (between G1 and G2), d13 (between G2 and G3) and d17 (between G3 and optical element 906). Lens 904 includes a plurality of N lens elements $L_i$. In lens 904, N=8. $L_1$ is the lens element closest to the object side and LN is the lens element closest to the image side, i.e. the side where the image sensor is located. This order holds for all lenses and lens elements disclosed herein. Each lens element $L_i$ comprises a respective front surface $S_{2i-1}$ (the index "2i-1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N.

Detailed optical data and surface data for system 900 are given in Tables 1-5. The values provided for these examples are purely illustrative and according to other examples, other values can be used.

Surface types are defined in Table 1. The coefficients for the surfaces are defined in Table 2. The surface types are:
a) Plano: flat surfaces, no curvature
b) Q type 1 (QT1) surface sag formula:

$$z(r) = \frac{cr^2}{1+\sqrt{1-(1+k)c^2r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}},$$

$$x = u^2$$

$$Q_0^{con}(x) = 1$$

$$Q_1^{con} = -(5-6x)$$

$$Q_2^{con} = 15 - 14x(3-2x)$$

$$Q_3^{con} = -\{35 - 12x[14 - x(21 - 10x)]\}$$

$$Q_4^{con} = 70 - 3x\{168 - 5x[84 - 11x(8-3x)]\}$$

$$Q_5^{con} = -[126 - x(1260 - 11x\{420 - x[720 - 13x(45 - 14x)]\})]$$

where {z, r} are the standard cylindrical polar coordinates, c is the paraxial curvature of the surface, k is the conic parameter, $r_{norm}$ is generally one half of the surface's clear aperture, and An are the polynomial coefficients shown in lens data tables. The Z axis is positive towards image. Values for optical lens diameter D are given as a clear aperture radius, i.e. D/2. The reference wavelength is 555.0 nm. Units are in mm except for refraction index ("Index") and Abbe #. Each lens element Li and each lens group Gi has a respective focal length, given in Table 3. The FOV is given as half FOV (HFOV). The definitions for surface types, Z axis, CA values, reference wavelength, units, focal length and HFOV are valid for all further presented tables.

Movements between the lens groups required for continuously switching lens 904 between $EFL_{MIN}$ and $EFL_{MAX}$ are given in Table 4. For switching lens 904 any state between the extreme states $EFL_{MIN}$ and $EFL_{MAX}$, a maximum movement (or stroke "s") of G13 lens group S=6.4 mm is required. Thus, a ratio R of the EFL differences in the extreme states and S is R=($EFL_{MAX}$−$EFL_{MIN}$)/S=2.34. Maximizing R is desired, as a smaller strokes S are required for ZF switching. A maximum stroke $S_{G2}$ of G2 lens group $S_{G2}$=0.16 mm is required.

Table 5 provides optical system 900's f number ("f/#"). The location as well as the size of the aperture of optical system 900 does not depend on the EFL, i.e. differences in the f/# for different ZF do depend solely on the differences in EFL. Therefore, f/#can be calculated by the equation:

$$f/\#=f/\#_{MIN}+(EFL-EFL_{MIN})/DA, f/\#MIN=EFL_{MIN}/DA,$$

where DA is the aperture diameter of lens 904. For 904, DA=6.4 mm.

TABLE 1

| Group | Lens | Surface | Type | R [mm] | T [mm] | $N_d$ | $V_d$ | D/2 [mm] |
|---|---|---|---|---|---|---|---|---|
| | Object | $S_0$ | Flat | Infinity | Infinity | | | |
| | Stop | $S_1$ | Flat | Infinity | −0.7086 | | | 3.2000 |
| G1 | L1 | $S_2$ | QTYP | 7.2419 | 1.8921 | 1.4850 | 53.1782 | 3.2000 |
| | | $S_3$ | QTYP | 18.7983 | 0.6032 | | | 3.0813 |
| | L2 | $S_4$ | QTYP | 18.4947 | 1.1307 | 1.5468 | 56.0217 | 3.0283 |
| | | $S_5$ | QTYP | −24.5222 | 0.4856 | | | 2.9873 |
| | L3 | $S_6$ | QTYP | 19.5116 | 0.2717 | 1.6416 | 22.4819 | 2.8615 |
| | | $S_7$ | QTYP | 7.4660 | See Table 4 | | | 2.8093 |
| G2 | L4 | $S_8$ | QTYP | −5.3754 | 1.3337 | 1.5316 | 56.1104 | 2.5621 |
| | | $S_9$ | QTYP | −15.9453 | 0.2420 | | | 2.6618 |
| | L5 | $S_{10}$ | QTYP | 19.9477 | 2.0247 | 1.6691 | 19.4419 | 2.7185 |
| | | $S_{11}$ | QTYP | 10.9265 | 0.0743 | | | 3.2319 |
| | L6 | $S_{12}$ | QTYP | 17.8434 | 2.4281 | 1.5449 | 55.9888 | 3.2716 |
| | | $S_{13}$ | QTYP | −5.0714 | See Table 4 | | | 3.4391 |
| G3 | L7 | $S_{14}$ | QTYP | −5.4117 | 0.5848 | 1.6691 | 19.4419 | 3.1543 |
| | | $S_{15}$ | QTYP | −4.0720 | 0.2398 | | | 3.1422 |
| | L8 | $S_{16}$ | QTYP | −5.3924 | 0.5109 | 1.5449 | 55.9888 | 3.0367 |
| | | $S_{17}$ | QTYP | 22.8720 | See Table 4 | | | 3.2126 |
| Optical element | | $S_{18}$ | Flat | Infinity | 0.2100 | 1.5168 | 64.1673 | |
| | | $S_{19}$ | Flat | Infinity | 0.6100 | | | |
| Image sensor | | $S_{20}$ | | | | | | |

TABLE 2

| Surface | Conic (k) | NR | $A_0$ | $A_1$ | $A_2$ | $A_3$ | $A_4$ | $A_5$ | $A_6$ |
|---|---|---|---|---|---|---|---|---|---|
| $S_2$ | 0 | 3.2996E+00 | 1.4578E−02 | 8.1846E−04 | −5.2650E−04 | 3.2739E−05 | 2.2991E−05 | −1.5238E−05 | 9.0778E−06 |
| $S_3$ | 0 | 3.1111E+00 | −4.7503E−02 | −2.5635E−03 | −2.8686E−03 | 4.4388E−04 | 4.3289E−05 | 4.1160E−05 | 7.0504E−07 |
| $S_4$ | 0 | 3.0452E+00 | −7.4665E−02 | −1.3899E−02 | −3.7781E−03 | 1.9778E−04 | 2.1081E−04 | 1.4152E−04 | −2.4738E−06 |
| $S_5$ | 0 | 2.9831E+00 | 2.7342E−02 | −2.2857E−02 | 1.7016E−03 | −9.6127E−04 | 5.6619E−04 | 3.2149E−05 | −5.8355E−06 |
| $S_6$ | 0 | 2.8497E+00 | −2.3323E−01 | 2.0669E−02 | 7.7476E−04 | −1.5206E−03 | 7.3176E−04 | −1.5529E−04 | 6.0820E−05 |
| $S_7$ | 0 | 2.7886E+00 | −2.6245E−01 | 2.9166E−02 | −1.3099E−03 | −7.8867E−04 | 4.1286E−04 | −1.2422E−04 | 5.7348E−05 |
| $S_8$ | 0 | 2.7467E+00 | 3.7747E−01 | −2.8367E−02 | 2.9782E−03 | −2.3877E−04 | 6.1869E−05 | −2.5424E−05 | −2.6538E−05 |
| $S_9$ | 0 | 2.8012E+00 | 5.1129E−01 | −1.3373E−02 | 1.9467E−03 | 8.9892E−04 | 5.2088E−04 | 2.5628E−04 | −2.0992E−04 |
| $S_{10}$ | 0 | 2.8415E+00 | −1.1251E−01 | 4.0492E−03 | −3.4345E−03 | 2.8249E−04 | 4.2133E−04 | 3.1735E−04 | −9.4213E−05 |
| $S_{11}$ | 0 | 3.2534E+00 | −1.8329E−01 | 6.4822E−03 | −6.6190E−03 | 1.1926E−03 | 2.9039E−04 | −1.5236E−04 | −1.9633E−04 |
| $S_{12}$ | 0 | 3.2884E+00 | 2.5239E−02 | −1.0904E−02 | −6.3097E−04 | 1.7412E−03 | 5.3182E−04 | −1.6865E−04 | −1.7726E−04 |

TABLE 2-continued

| Surface | Conic (k) | NR | $A_0$ | $A_1$ | $A_2$ | $A_3$ | $A_4$ | $A_5$ | $A_6$ |
|---|---|---|---|---|---|---|---|---|---|
| $S_{13}$ | 0 | 3.4647E+00 | 6.8814E−03 | −7.1947E−03 | 2.2200E−03 | 1.1803E−03 | 5.4568E−04 | 2.2585E−04 | 9.6903E−05 |
| $S_{14}$ | 0 | 3.1726E+00 | 2.8217E−01 | 1.8130E−02 | 9.6878E−03 | 4.1604E−04 | 4.0094E−04 | 4.2186E−04 | −7.6384E−05 |
| $S_{15}$ | 0 | 3.1884E+00 | 4.5009E−01 | 2.6502E−02 | 1.5777E−02 | −9.3450E−05 | 1.1016E−03 | 3.9066E−04 | −5.4700E−05 |
| $S_{16}$ | 0 | 3.1586E+00 | −1.1232E−01 | 2.5743E−02 | −2.0000E−03 | 4.9250E−04 | 6.3863E−04 | −3.7847E−04 | 2.7701E−05 |
| $S_{17}$ | 0 | 3.3731E+00 | −2.5740E−01 | 4.2164E−02 | −8.5771E−03 | 3.3500E−03 | −3.5260E−04 | −1.1751E−04 | 1.0286E−04 |

TABLE 3

| Lens # | Lens or group focal length [mm] |
|---|---|
| L1 | 22.9742 |
| L2 | 19.4119 |
| L3 | −18.8660 |
| L4 | −15.9017 |
| L5 | −39.3424 |
| L6 | 7.5043 |
| L7 | 20.7171 |
| L8 | −7.9309 |
| G1 | 20.9457 |
| G2 | 13.8027 |
| G3 | −12.2743 |

TABLE 4

| | | Configuration 1 EFL = 15 mm | Configuration 2 EFL = 22.5 mm | Configuration3 EFL = 30 mm |
|---|---|---|---|---|
| T [mm] | $S_7$ | 1.4118 | 5.1246 | 7.8118 |
| | $S_{13}$ | 6.5013 | 2.7885 | 0.1013 |
| | $S_{17}$ | 0.9176 | 4.6456 | 7.3176 |

TABLE 5

| | Configuration 1 EFL = 15 mm | Configuration 2 EFL = 22.5 mm | Configuration3 EFL = 30 mm |
|---|---|---|---|
| f/# | 2.34 | 3.52 | 4.69 |

For switching ZF, G13 is moved with a large stroke of e.g. 2 mm-15 mm with respect to G2 and with respect to image sensor 908. G2 is moved with a small stroke of e.g. 0.1 mm-5 mm with respect to G13 and with respect to image sensor 208. For focusing, G13 and G2 are moved together as one lens with respect to image sensor 908. Lens 904 may be a cut lens as known in the art, as shown exemplarily in FIG. 10. For example, lens 904 may have a D-cut ratio may be 0%-50%.

FIG. 10 shows an example a cut lens as known in the art and numbered 1000. The coordinate system shown is the same coordinate system shown in FIG. 9A-9C. Cut lens 1000 is cut along an axis parallel to the x axis at the sides marked 1002 and 1004. At the sides marked 1006 and 1008, lens 1000 is not cut. Therefore, lens 1000 has an optical lens width $W_L$ (measured along the x axis) which is larger than its optical lens height $H_{L\text{-}CUT}$ (measured along the y axis). Using a cut lens such as lens 1000 is beneficial in folded cameras, as it supports slim camera height while still providing a relatively large aperture area (AA) of $AA > H_{L\text{-}CUT}^2$ and $AA > (H_{L\text{-}CUT}/2)^2 \cdot \pi$. For a lens element that determines the aperture of a camera, the optical lens height and width is equivalent to the height and the width of the aperture of the lens, i.e. $H_{L\text{-}CUT} = H_A$ and $W_L = W_A$. In optical lens system 900, lens elements which determine the lens aperture may be cut, meaning that $W_A > H_A$ is fulfilled.

FIG. 11 shows an example of a cut prism as known in the art and numbered 1100. The coordinate system shown is the same coordinate system shown in FIG. 9A-9C. Cut prism 1100 is cut along an axis parallel to the x axis at the side marked 1104. At the side marked 1102, prism 1100 is not cut. As shown, an optical width of cut prism 1100 ("$W_P$", measured along the x axis) is larger than an optical height of cut prism 1100 ("$H_{P\text{-}CUT}$", measured along the y axis) by 0%-30%. A cut prism may be beneficial for obtaining a slim camera having a low camera height that still lets in a relatively large amount of light.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A camera module, comprising:
    a folded continuous zoom Tele (FCZT) camera comprising an optical path folding element (OPFE) for folding a first optical path (OP1) to a second optical path (OP2), a lens including N lens elements, the lens being divided into three lens groups numbered, in order from an object side of the lens, G1, G2 and G3 and having a lens aperture height $H_A$ measured along OP1, and
    an image sensor,
    wherein the FCZT camera is configured to change a zoom factor (ZF) continuously between a minimum zoom factor $ZF_{MIN}$ and a maximum zoom factor $ZF_{MAX}$ by moving G1 and G3 together relative to G2 and by moving G2 relative to the image sensor, wherein the camera module has a camera module height $H_M$ measured along OP1, and wherein $H_M < H_A + 3$ mm.
2. The camera module of claim 1, wherein $H_M < H_A + 2.5$ mm.

3. The camera module of claim 1, wherein $H_M < H_A + 2.0$ mm.

4. The camera module of claim 1, wherein $H_M < H_A + 1.75$ mm.

5. The camera module of claim 1, wherein $H_M$ is in the range of 5 mm-12.5 mm.

6. The camera module of claim 1, wherein $H_M$ is in the range of 5 mm-10 mm.

7. The camera module of claim 1, wherein $H_M$ is in the range of 5 mm-9 mm.

8. The camera module of claim 1, wherein $H_M$ is in the range of 5 mm-8 mm.

9. The camera module of claim 1, wherein $H_A$ is in the range of 3 mm-10 mm.

10. The camera module of claim 1, wherein $H_A$ is in the range of 4 mm-8 mm.

11. The camera module of claim 1, wherein G1 and G3 are included in a single G13 carrier, wherein G2 is included in a G2 carrier, wherein G1 and G3 are moved together relative to G2 by moving the G13 carrier relative to the G2 carrier.

12. The camera module of claim 11, wherein both the G13 carrier and the G2 carrier include rails for defining the position of G2 relative to G13.

13. The camera module of claim 1, wherein the FCZT camera has effective focal length (EFL) that fulfills 7.5 mm<EFL<50 mm.

14. The camera module of claim 1, wherein the lens is a cut lens with a cut lens aperture height $H_{A\text{-}CUT}$ measured along an axis parallel to OP1 and with a lens aperture width $W_A$ measured along an axis perpendicular to both OP1 and OP2, and wherein $W_A$ is larger than $H_{A\text{-}CUT}$ by between 5% and 50%.

15. The camera module of claim 1, included in a multi-camera together with Wide camera.

16. The camera module of claim 1, wherein the EFL is switched continuously between a minimal effective focal length $EFL_{MIN}$ corresponding to $ZF_{MIN}$ and a maximal effective focal length $EFL_{MAX}$ corresponding to $ZF_{MAX}$, and wherein a ratio $EFL_{MAX}/EFL_{MIN} > 1.5$.

17. The camera module of claim 16, wherein $EFL_{MAX}/EFL_{MIN} > 1.75$.

18. The camera module of claim 1, wherein the EFL is switched continuously between a minimal effective focal length $EFL_{MIN}$ corresponding to $ZF_{MIN}$ and a maximal effective focal length $EFL_{MAX}$ corresponding to $ZF_{MAX}$, and wherein $EFL_{MIN}$ is in the range of 7.5 mm-25 mm and wherein $EFL_{MAX}$ is in the range of 20 mm-50 mm.

19. The camera module of claim 1, wherein the OPFE is a prism.

20. The camera module of claim 19, wherein the prism is a cut prism with a prism optical height $H_{P\text{-}CUT}$ measured along an axis parallel to OP1 and a prism optical width $W_P$ measured along an axis perpendicular to both OP1 and OP2, and wherein $W_P$ is larger than $H_{P\text{-}CUT}$ by between 5% and 30%.

21. The camera module of claim 1, included in a smartphone.

* * * * *